(12) United States Patent
Yamamoto

(10) Patent No.: US 7,321,462 B2
(45) Date of Patent: Jan. 22, 2008

(54) FLUORESCENCE MICROSCOPE

(75) Inventor: Syohei Yamamoto, Osaka (JP)

(73) Assignee: Keyence Corporation, Osaka (JP)

( * ) Notice: Subject to any disclaimer, the term of this patent is extended or adjusted under 35 U.S.C. 154(b) by 270 days.

(21) Appl. No.: 11/133,705

(22) Filed: May 20, 2005

(65) Prior Publication Data
US 2006/0119935 A1 Jun. 8, 2006

(30) Foreign Application Priority Data
Dec. 3, 2004 (JP) .............................. 2004-351358

(51) Int. Cl.
*G02B 21/06* (2006.01)
*G02B 21/00* (2006.01)
(52) U.S. Cl. .................... 359/390; 359/368; 359/385
(58) Field of Classification Search ........ 359/368–390, 359/511, 600, 611, 808–819
See application file for complete search history.

(56) References Cited

U.S. PATENT DOCUMENTS

| | | | |
|---|---|---|---|
| 5,119,233 A * | 6/1992 | Hayashi ....................... | 359/390 |
| 6,414,805 B1 | 7/2002 | Reichman et al. ........... | 359/889 |
| 2002/0159143 A1 | 10/2002 | Yonezawa ................... | 359/385 |
| 2004/0063089 A1 | 4/2004 | Imaizumi et al. ............. | 435/4 |
| 2005/0179892 A1 | 8/2005 | Gerstner et al. ............ | 356/318 |
| 2005/0270640 A1* | 12/2005 | Miki .......................... | 359/381 |

FOREIGN PATENT DOCUMENTS

| | | | |
|---|---|---|---|
| JP | 6-5679 | * | 1/1994 |
| JP | 10123425 | | 5/1998 |
| JP | 2000-98250 A | | 4/2000 |
| JP | 2000-227556 | | 8/2000 |
| JP | 2002-207177 | | 7/2002 |
| JP | 2003-228004 | | 8/2003 |
| JP | 2004-245979 | | 9/2004 |
| WO | WO 03/019161 | * | 3/2003 |
| WO | WO 03/098313 A2 | | 11/2003 |

OTHER PUBLICATIONS

English translation of the Japanese reference No. 6-5679.*
English translation of the Japanese reference No. 2004-245979.*

* cited by examiner

*Primary Examiner*—Thong Q Nguyen
(74) *Attorney, Agent, or Firm*—Kilyk & Bowersox, P.L.L.C.

(57) ABSTRACT

An inverted fluorescence microscope is described which irradiates an excitation light onto a sample for observation of a fluorescent image of the sample. The fluorescence microscope includes (a) a transmissive illumination light source, which is arranged above a stage for placing the sample and the transmissive illumination light source is arranged facing a horizontal direction; (b) a tilt mirror, which reflects light from the transmissive illumination source and illuminates the sample on the stage from above; (c) a transmissive illumination optical unit including at least the tilt mirror is disposed so as to move in a direction in which the transmissive illumination optical unit is brought away from the stage from a normal position; and (d) a sample cover for shielding a light from the stage, wherein the sample cover is displaceable so as to expose the stage.

12 Claims, 34 Drawing Sheets

FLUORESCENCE MICROSCOPE

The present application claims foreign priority based on Japanese Patent Application No. 2004-351358, filed Dec. 3, 2004, the contents of which is incorporated herein by reference.

BACKGROUND OF THE INVENTION

1. Technical Field

The present invention relates to a fluorescence microscope.

2. Related Art

A fluorescence microscope on which a fluorescence emitted by a sample is observed is known as one type of microscope. The fluorescence microscope includes an upright type where an objective lens is arranged above a stage and an inverted type where an objective lens is arranged below a stage. The basic structure of the fluorescence microscope comprises an epi illumination section for irradiating excitation light onto a sample and a fluorescence observation section for observing an image formed from a fluorescence emitted by the sample. The fluorescence observation section includes an eye lens optical system for human eye observation and/or an imaging portion such as a CCD camera. The excitation light from the epi illumination section is irradiated onto a sample via a filter.

Generally, a fluorescence microscope has been placed in a darkroom to perform fluorescence observation in the darkroom. In recent years, it is a more common practice to display an image from an imaging portion attached to a fluorescence microscope on an image display portion such as a CRT and an LCD for observation purposes or process image data on a personal computer.

In such a use environment, operation of a personal computer in a darkroom is rather inconvenient and light emitted from a CRT may be incident around the stage of a fluorescence microscope thus degrading the quality of a fluorescent image. In order to solve these problems, JP-A-2002-207177 proposes provision of walls that shield light from a stage for placing a sample and an objective lens. This proposal has an advantage of doing without a need to work in a darkroom for fluorescence observation.

An assumption that a fluorescence microscope can be used for fluorescence observation without using a darkroom will naturally lead to a request to use a fluorescence microscope on a private desk in a library where routine work is performed. This presents a need for a more compact fluorescence microscope. The external design of a fluorescence microscope is requested to be sleeker.

JP-A-2002-207177 that proposes provision of walls that shield light from a stage for placing a sample and an objective lens, or a sample cover, discloses a set of double doors of the sample cover enclosing the stage in FIG. 1 and proposes a hinged door in FIG. 4. In case a sample door of such a form is provided, when the sample cover is opened, the sample cover significantly protrudes on the side of the fluorescence microscope, which greatly increases the substantial footprint of the fluorescence microscope.

JP-A-2002-207177 discloses, in FIG. 6, a lightproof method by suspending a curtain around a stage while supported by a curtain rail. According to this curtain method, opening the curtain for expose the stage does not increase the substantial footprint of the fluorescence microscope. However, a suspended curtain has problems with lightproofness and durability as well as the appearance is not favorable and could degrade the commerciality of the fluorescence microscope.

SUMMARY OF THE INVENTION

A main object of the invention is to provide a fluorescence microscope that avoids, as much as possible, the increase in the substantial footprint of the fluorescence microscope due to a lightproof member when the lightproof member around a stage is opened to expose the stage.

A further object of the invention is to provide a fluorescence microscope that is favorable in terms of its appearance as well as the above main purpose.

The technical challenge of the invention may be attained, in accordance with the invention, by providing:

a fluorescence microscope comprising: a stage for placing a sample; and an objective lens arranged adjacently to the stage; the fluorescence microscope irradiating excitation light onto a sample on the stage for observation of a fluorescent image of the sample; characterized in that the fluorescence microscope comprises a sample cover for shielding light from the stage and that the fluorescence microscope is capable of exposing the stage while the sample cover is displaced upward, downward or backward.

According to the invention, the sample cover assumed when the stage is exposed is in a position displaced upward, downward or backward from the stage. This minimizes the increase in the footprint of the fluorescence microscope. The sample cover may be typically fabricated from a plate member of a molded metal or plastic, so that the sample cover has an excellent durability. Also, it is easy to provide an external design to provide a good appearance of the sample cover.

According to a preferred embodiment of the invention, the fluorescence microscope further comprises a main unit enclosing the fluorescence microscope, characterized in that the sample cover is displaced upward, downward or backward along the front face of the main unit case thus exposing the stage.

When a fluorescence microscope is enclosed by a main unit case, it is easy to apply a design to the appearance of the main unit case so that it is possible to design a good appearance of the overall shape of the fluorescence microscope.

The fluorescence microscope according to the invention may be an inverted type or an upright type where an objective lens is arranged above a stage as disclosed in JP-A-2002-207177.

In an embodiment of the invention, the main unit case further includes a lower cover positioned below the sample cover, the lower cover having a cross section of a trapezoid substantially the same as that of the sample cover. The sample cover is displaced forward and downward in order for the sample cover to be adjacent to the lower cover to cause the sample cover to overlap the lower cover. The cross section of the sample cover may have a shape of "C" in alphabet having side faces and a front face or may have an arc shape of a convex facing forward.

The sample cover included in the invention may be split side by side and the right/left split sample covers may be once displaced outward in horizontal direction then moved backward so that the stage will be exposed.

DETAILED DESCRIPTION OF THE INVENTION

Figure 1:
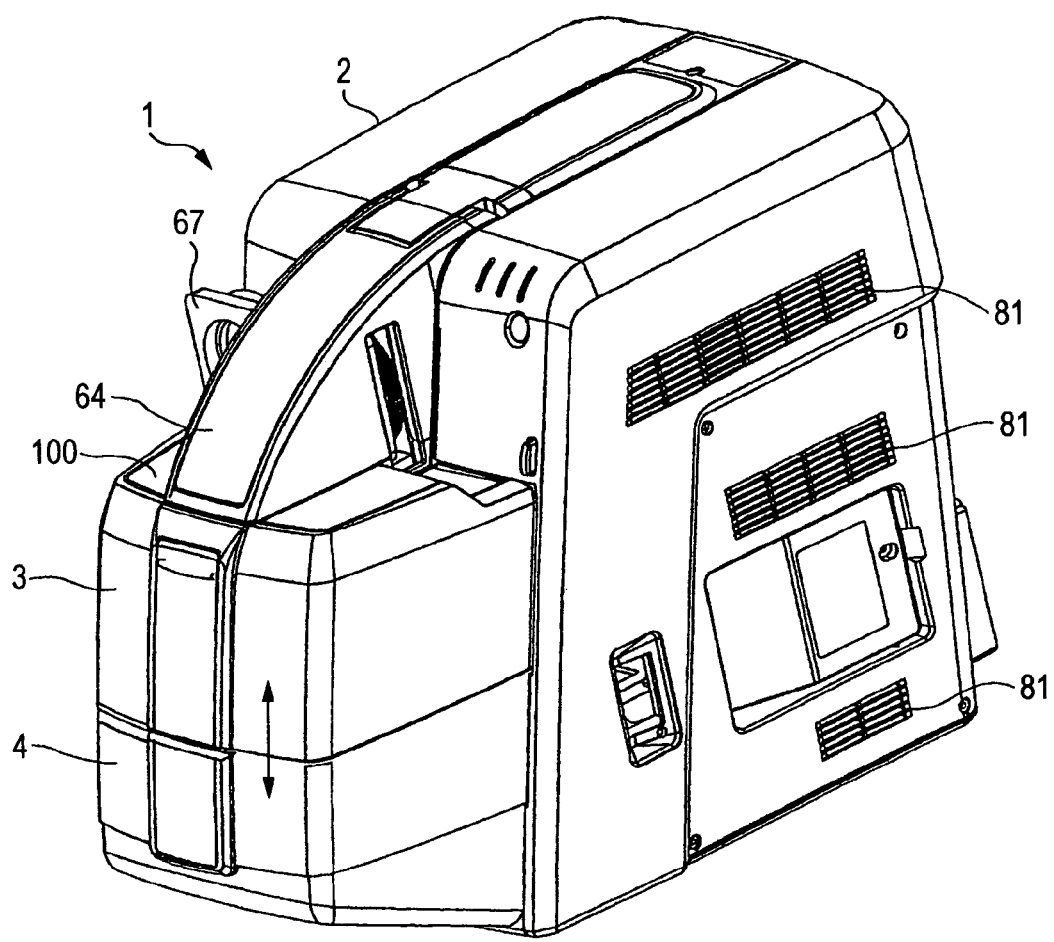
FIG. 1 is an external view of an inverted fluorescence microscope according to an embodiment showing a state where the sample cover is closed.

FIG. 1 is an external perspective view of an inverted fluorescence microscope. In FIG. 1, an inverted fluorescence microscope comprises a sample cover 3 in front of a main unit case 2. The sample cover 3 can be displaced downward along a lower cover 4 substantially comprising part of the main unit case 2 below, thereby inserting/retrieving a sample. By bringing the sample cover 3 in the state of FIG. 1, that is, in a closed state, it is possible to perform fluorescence observation. The main unit case 2, sample cover 3 and lower cover 4 are made of a plate member of a molded metal or plastic.

Figure 2:
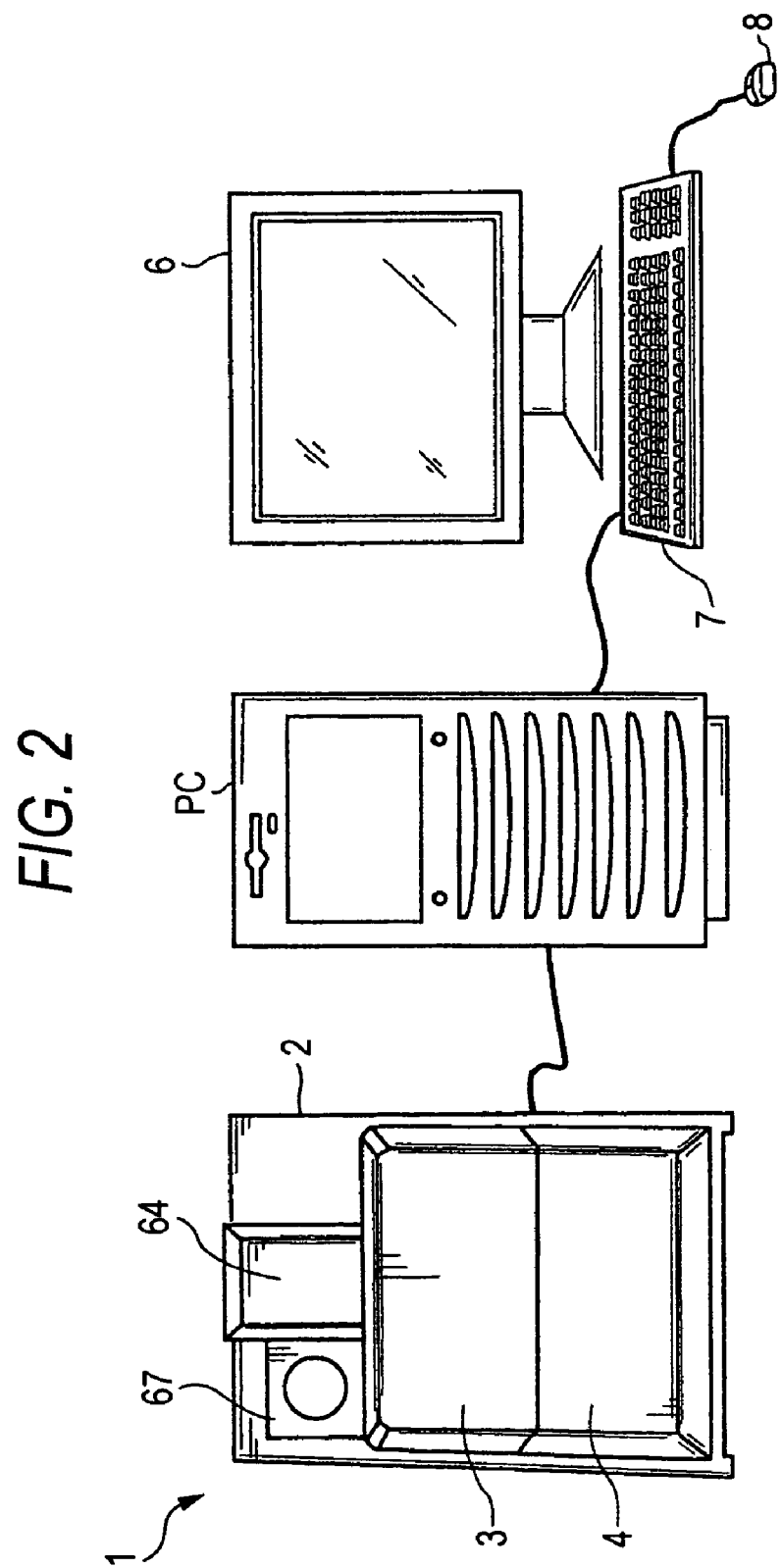
FIG. 2 illustrates the use form of a fluorescence microscope according to the embodiment.

Referring to FIG. 2, the inverted fluorescence microscope 1 comprises, inside the main case 2, a bright field transmissive illumination system, an epi illumination system, an imaging system, as well as a power supply unit, power supply board, and a controller. The inverted fluorescence microscope 1, when connected to a monitor 6 via a personal computer (PC), allows the user to make various operations and setting by using a mouse 8 and a keyboard 7.

Figure 3:
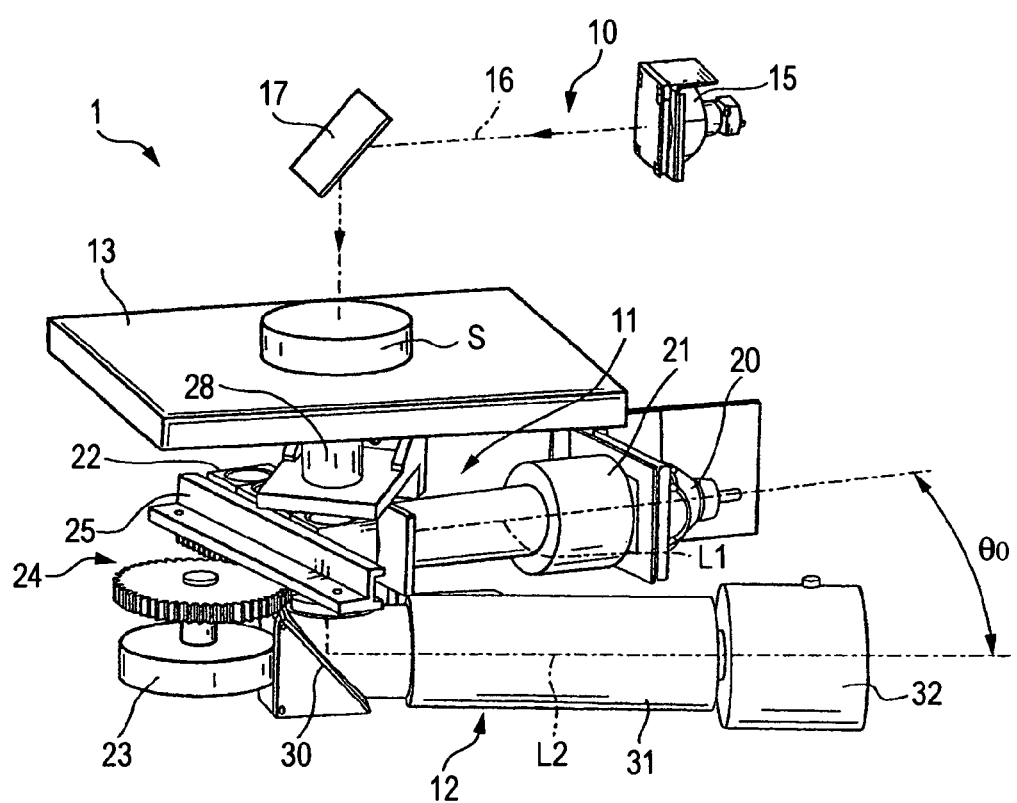
FIG. 3 is a perspective view illustrating the layout of each of the illumination system and the imaging system included in the inverted fluorescence microscope according to the embodiment.

FIG. 3 shows an overall configuration of the bright field transmissive illumination system, epi illumination system, and imaging system. In FIG. 3, a reference number 10 represents a bright field transmissive illumination system, 11 an epi illumination system, and 12 an imaging system. The bright field transmissive illumination system is arranged above the height position of a stage 13 while the epi illumination system and the imaging system are arranged below the height position of a stage 13.

The bright field transmissive illumination system 10 for use in observation by way of transmissive light typically comprises a transmissive illumination lamp 15 consisting of a halogen lamp. As those skilled in the art will immediately notice, the halogen lamp is arranged facing the horizontal direction. Light 16 emitted from the halogen lamp 15 is directed downward in vertical direction by a tilt mirror 17, passes through a condenser lens (not shown), and irradiates a sample S on the stage 13.

The epi illumination system 11 for use in fluorescence observation typically comprises an epi illumination lamp 20 consisting of a mercury lamp. The mercury lamp 20 is arranged in horizontal direction. The light emitted from the mercury lamp 20 passes through a heat absorption filter 21 and a collector lens, then an excitation filter to be transformed into excitation light having a specific short wavelength band. The excitation light is directed upward in vertical direction to the sample S by a tilt dichroic mirror, and passes through the objective lens 28 to irradiate the sample from below.

The excitation filter and the dichroic mirror are incorporated into a filter cassette 22. In the example of FIG. 3, four types of filter cassette 22 having different characteristics from each other are arranged linearly adjacent to each other in horizontal direction. That is, selection of the filter cassette 22 is linear. In order to select an arbitrary filter cassette 22 from a plurality of filter cassettes 22, the user rotates an operation control 23 to cause the filter cassette 22 to be linearly displaced along a guide rail 25 by way of a rack-and-pinion gear 24. This operation may be effected using a power motor.

Figure 4:
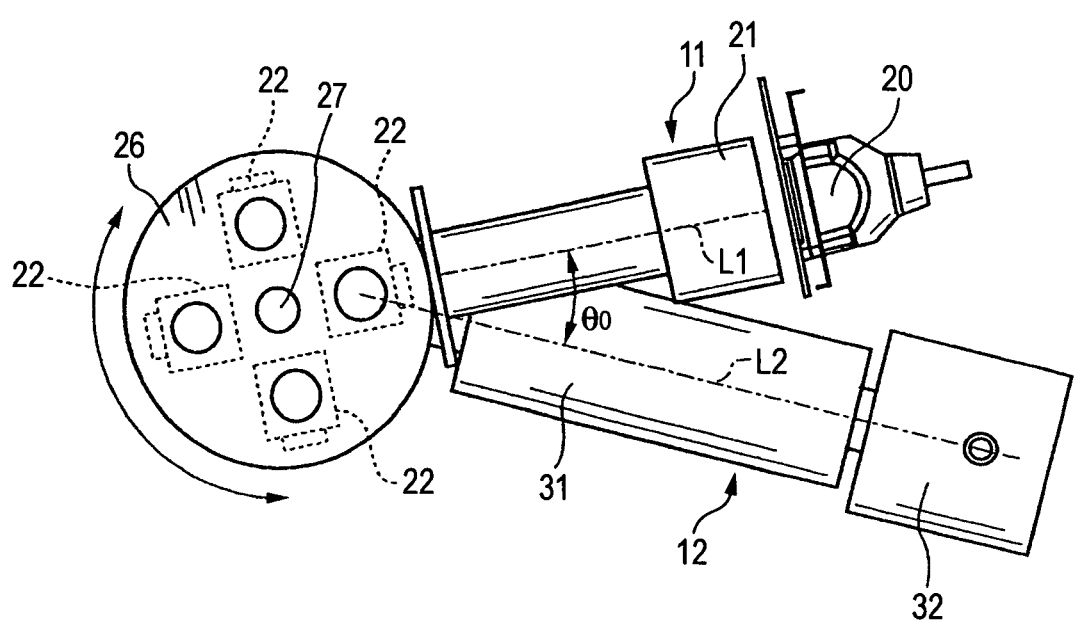
FIG. 4 is a plan view illustrating a rotary filter cassette change mechanism included in the inverted fluorescence microscope according to the embodiment.

The fluorescence microscope 1 shown in FIG. 1 employs a rotary system shown in FIG. 4 instead of the above linear-motion system. The rotary filter cassette system has a horizontal disc 26 to detachably mount four filter cassettes 22 of different characteristics. On the horizontal disc 26 are arranged the filter cassettes 22 equidistantly to each other (in 90-degree intervals). The horizontal disc 26 is driven by a related power motor and rotates about a vertical axis 27. By rotating the horizontal disc 26, it is possible to select a filter cassette 22 of a desired characteristic. As a variation, the horizontal disc 26 may be manually rotated, like the operation control 23 described referring to FIG. 4.

Returning to FIG. 3, the stage 13 arranged adjacent upward to the objective lens 28 individually travels in X and Y-axis directions that cross an optical axis. By moving the objective lens 28 up and down in Z-axis direction with the stage 13 stationary in vertical direction, it is possible to adjust the relative positions of the stage 13 and the objective lens 28. Or, the stage 13 may be moved in Z-axis direction as well as X and Y-axis directions in order to adjust the relative distance to the objective lens 28. While such relative positioning of the stage 13 and the objective lens 28 may be made manually, it is made using a power motor described below in this embodiment.

The imaging system 12 comprises an imaging mirror 30 arranged directly below the filter cassette 22, an imaging barrel 31 extending horizontally toward the imaging mirror 30, and an imaging unit 32 (for example a CCD camera) attached to an end of the imaging barrel 31.

In the area below the stage 13, when the epi illumination system 11 and the imaging system 12 both extending in horizontal direction are viewed from above, the horizontal axis L1 of the epi illumination system 11 and the horizontal axis L2 of the imaging system 12 are arranged in the V shape with an angle of nip $\theta_0$. As best understood from FIG. 4, the mercury lamp 20 and the CCD camera 32 are arranged offset to each other side by side as seen from above.

In this way, by arranging epi illumination system 11 and the imaging system 12 both extending in horizontal direction in the shape of V, the mercury lamp 20 and the CCD camera 32 are arranged offset to each other side by side. Without considering the interference between the mercury lamp 20 and the CCD camera 32 both of which are relatively large, it is possible to reduce the height dimension of the fluorescence microscope 1 by setting to minimum the vertical spacing between the epi illumination system 11 and the imaging system 12 positioned below the same. In other words, in case the mercury lamp 20 and the CCD camera 32 are arranged up and down within the same vertical plane, the spacing between the epi illumination system 11 and the imaging system 12 is limited by the interference between the mercury lamp 20 and the CCD camera 32.

As in this embodiment, when the epi illumination system 11 and the imaging system 12 both extending in horizontal direction are arranged in the shape of V in order to set to minimum the vertical spacing between the epi illumination system 11 and the imaging system 12 positioned below the same, the distance between the filter cassette 22 and the imaging mirror 30 is also reduced. This allows the length dimension of the imaging barrel to be reduced.

Figure 5:
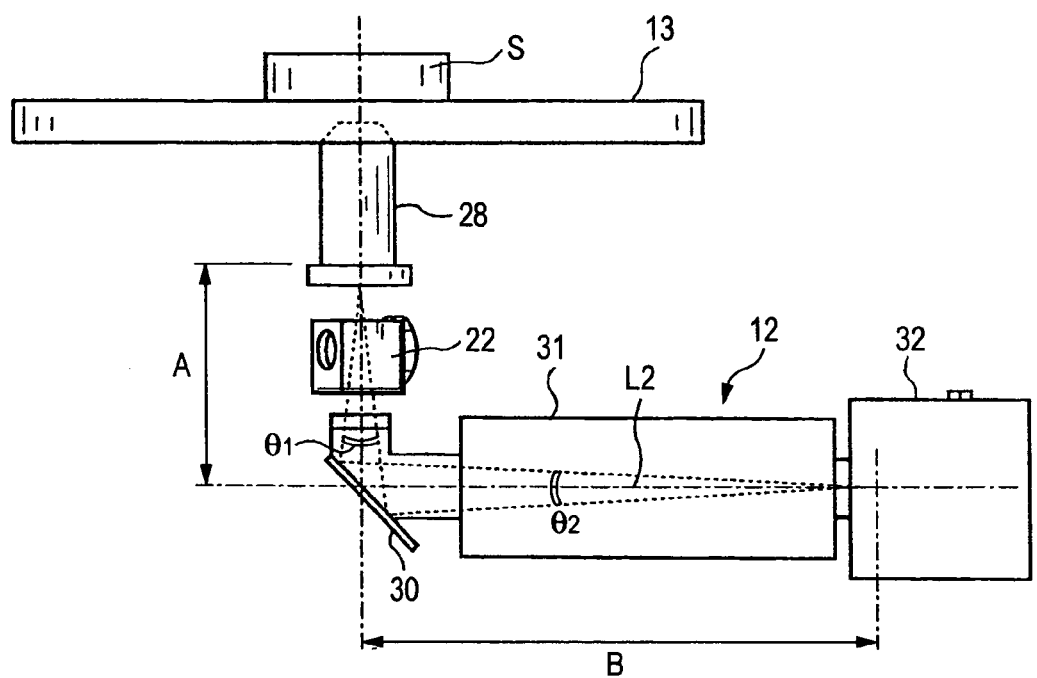
FIG. 5 illustrates the operation effect that accompanies the V-shaped arrangement of an epi illumination system and an imaging system employed by the inverted fluorescence microscope according to the embodiment.

This approach is detailed referring to FIG. 5. A reference sign A in FIG. 5 represents the distance between the objective lens 28 and the imaging mirror 30 while a reference sign B represents the distance between the imaging mirror 30 and the CCD light-receiving surface of the CCD camera 32. The light from the objective lens 28 to the imaging mirror is diffused while the light from the imaging mirror 30 to the CCD camera 32 is convergent. The diffusion angle $\theta_1$ in the diffused system is equal to the light convergence angle $\theta_2$. Thus, the shorter the distance A is, the shorter the distant B becomes. It is thus possible to reduce the length dimension of the imaging barrel 31.

The transmissive illumination system 10 and the epi illumination system 11 are used selectively. When the transmissive illumination system 10 is selected, transmissive illumination light 16 emitted by the halogen lamp 15 is reflected on the tilt mirror 17 to illuminate the sample S from above. An image of the sample S obtained by way of the transmissive illumination light 16 passes through the objective lens 28, the dichroic mirror of the filter cassette 22, an absorption filter, the imaging mirror 30, and is captured by the CCD camera 32 arranged in horizontal direction.

When the epi illumination system 11 is selected, light emitted by the mercury lamp 20 passes through a heat absorption filter, a collector lens, and the excitation filter of the filter cassette 22 and a dichroic mirror, then the resulting excitation light irradiates the sample S from below. The fluorescent matter included in the sample S in preprocessing receives excitation light to irradiate a fluorescence. The fluorescent image passes through the objective lens 28, the dichroic mirror and the absorption filter, and is captured by the CCD camera 32.

Figure 6:
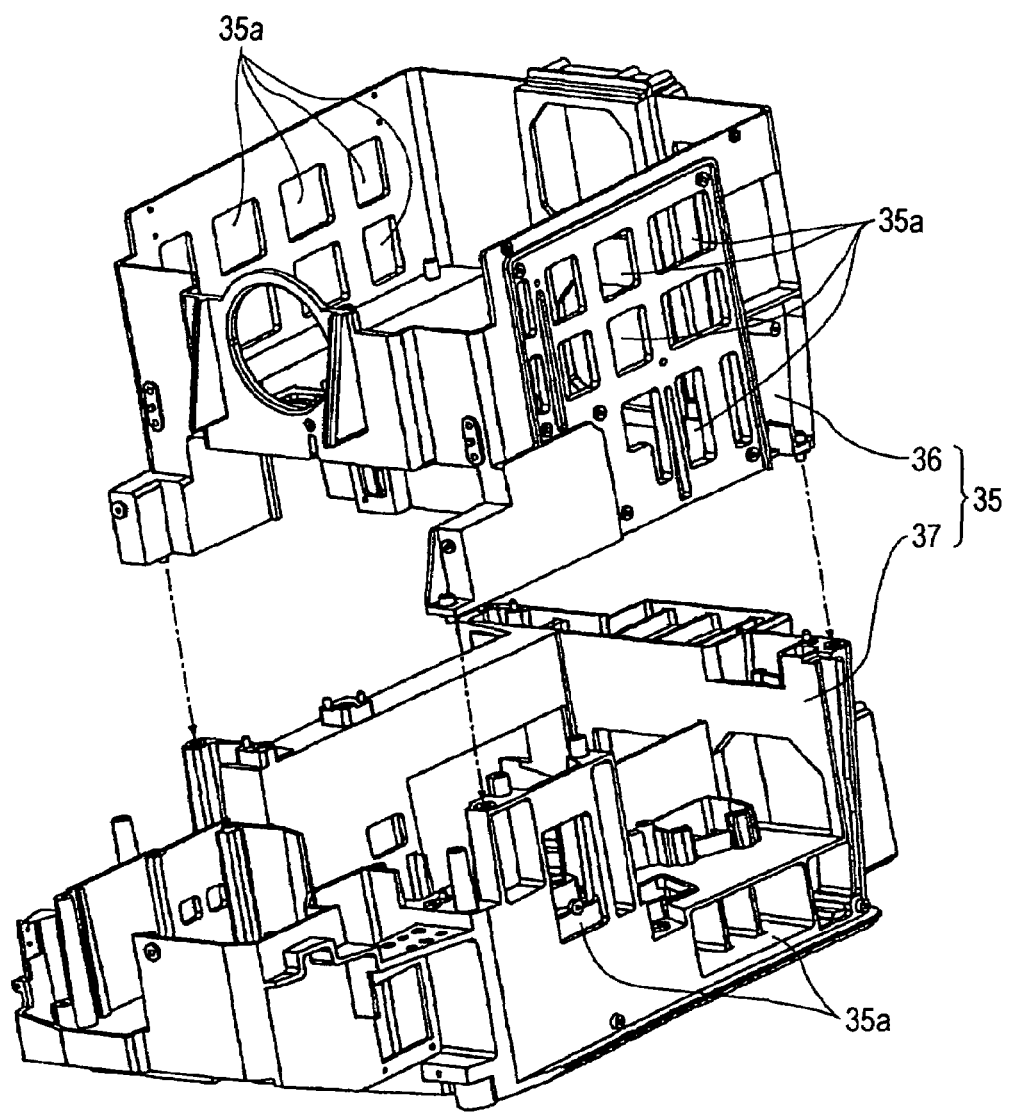
FIG. 6 is an exploded perspective view of a two-segment chassis constituting the framework of the fluorescence microscope according to the embodiment.
Figure 7:
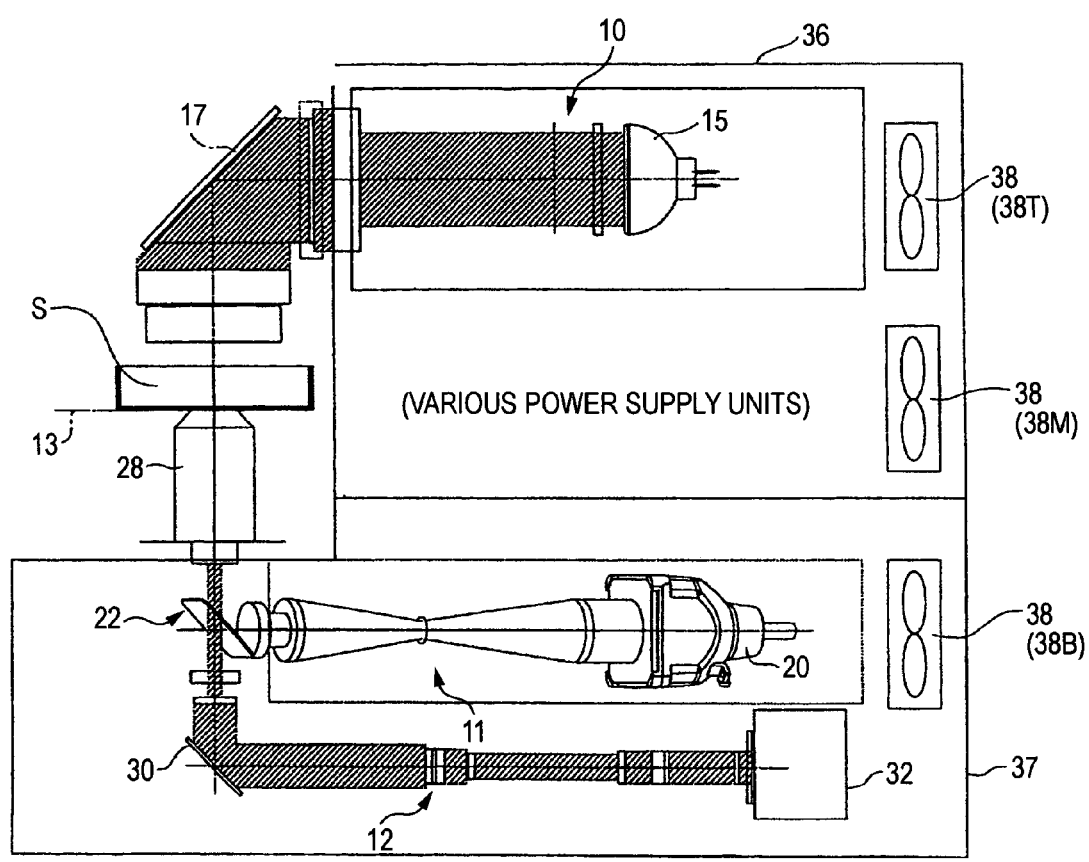
FIG. 7 illustrates the arrangement of a transmissive illumination system, an epi illumination system, an imaging system, and various power supply units mounted on a chassis.

The fluorescence microscope 1 shown in FIG. 1 has a chassis 35 shown in FIG. 6 as a framework. The chassis 35 has a two-segment structure of an upper chassis 36 and a lower chassis 37. The upper chassis 36 and the lower chassis 37 are both aluminum-alloy die castings or castings which are lightweight and which have relatively low thermal expansion coefficients. Referring to FIG. 7, the transmissive illumination system 10 is arranged on the upper chassis 36. The epi illumination system 11 and the imaging system 12 are arranged on the lower chassis 37. Inside the chassis 35 are placed various boards such as a controller board and a power board, as well as one side of the transmissive illumination system 10, and various power supply units between the transmissive illumination system 10 and the epi illumination system 11. On the rear surface of the chassis 35 are attached a plurality of (three in the embodiment) electric fan units 38 in vertical alignment. Heat generated inside the chassis 35, for example, heat from the halogen lamp 15, the mercury lamp, various power supply units and the motor is forcibly exhausted to outside from behind the chassis 35.

As shown in FIG. 6, in the side walls of the chassis 35 are formed numerous apertures 35a. These apertures 35a are intended for a lightweight design and mounting of components, and introduction of external air as mentioned later.

Figure 8:
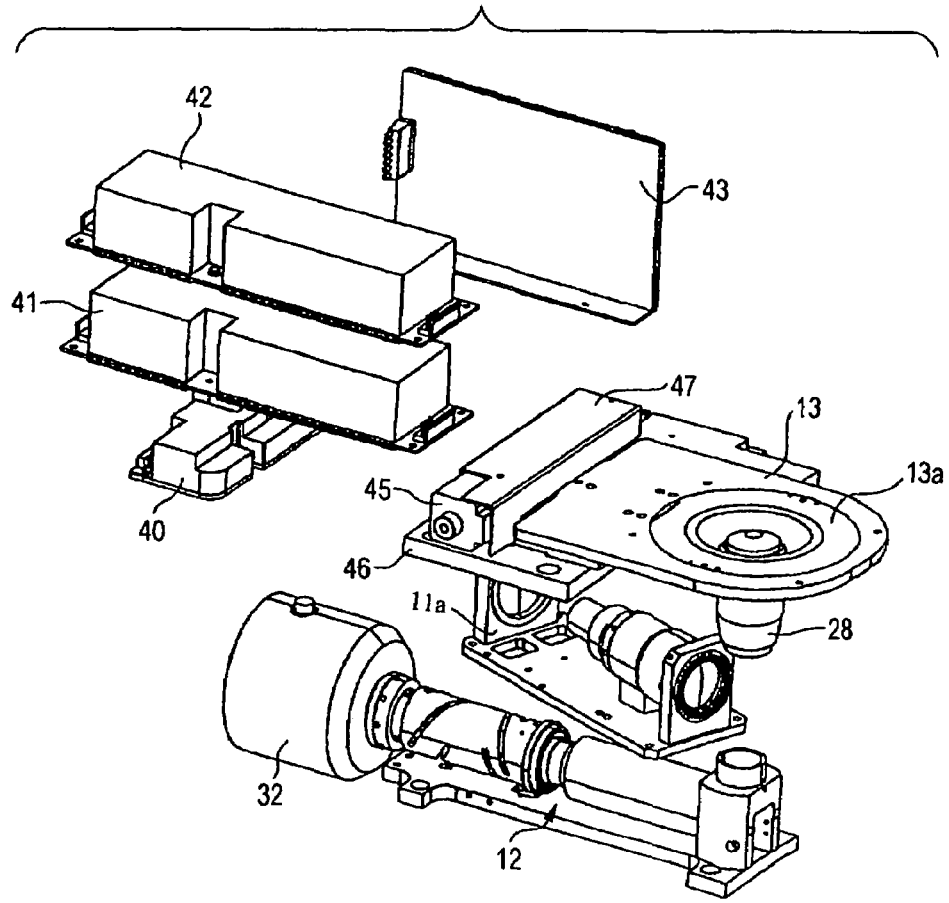
FIG. 8 illustrates the specific arrangement of a power supply unit mounted on a chassis.

FIG. 8 shows some of the components assembled into the chassis 35. In FIG. 8, a reference numeral 40 represents a power supply unit for feeding power to the mercury lamp 20 of the epi illumination systems, indicated as feature 11a for purposes of this view, 41 a power supply unit for feeding power to control systems such as a motor system incorporated into the fluorescence microscope 1, 42 a power supply unit for feeding power to the halogen lamp 15 of the transmissive illumination system 10, and 43 a motor drive circuit board for driving various motors incorporated into the fluorescence microscope 1. The motor drive circuit board 43 controls, for example, a motor 45 for driving the stage 13 in X-axis and Y-axis directions, a motor (not shown) for driving the power zoom mechanism of the imaging system 12, and a motor (not shown) for driving the diaphragm of the mercury lamp 20. While a motor for positioning of the stage 13 in Z-axis direction is mounted on a common motor platform 46, a cover 47 is attached to the motor so that it does not appear in FIG. 8.

As understood from FIG. 8, the stage 13, the motor 45 for driving the same, the objective lens 28 are formed into a unit, which is assembled to the lower chassis 37.

Figure 9:
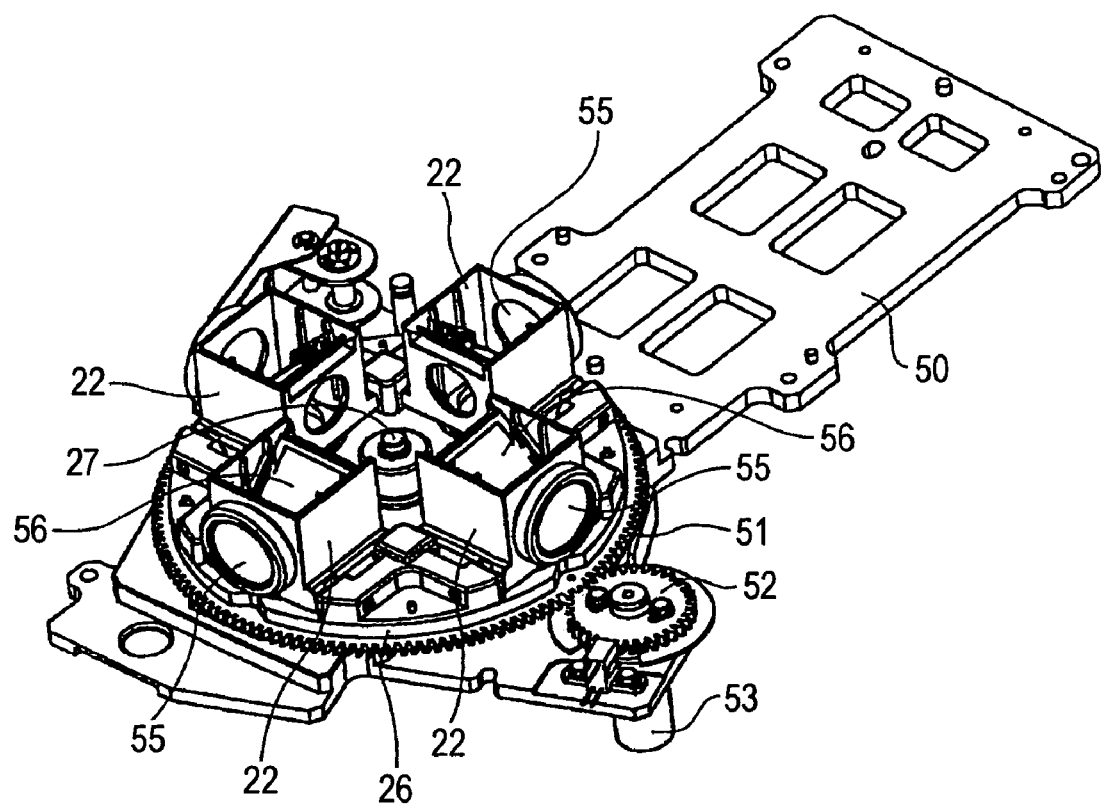
FIG. 9 is a perspective view showing the specific configuration of the rotary filter cassette change mechanism illustrated in FIG. 4.
Figure 10:
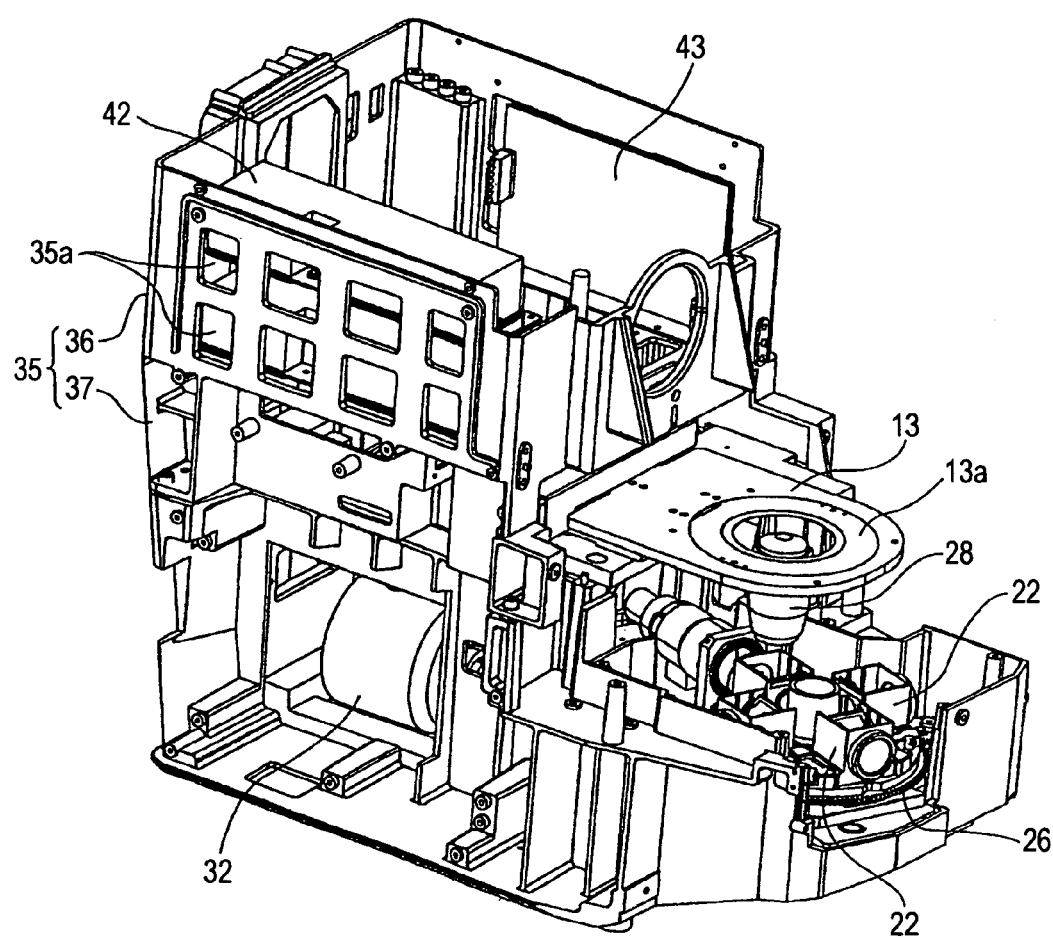
FIG. 10 is a perspective view showing the state where the rotary filter cassette change mechanism is incorporated into a chassis.

FIG. 9 shows the aforementioned rotary filter cassette system. The central vertical axis 27 of the horizontal disc 26 is assembled to the base plate 50. On the periphery of the horizontal disc 26 are attached a circular ring gear 51. The drive gear 52 that is engaged with the circular ring gear 51 is driven by the motor 53 fixed to the base plate 50. The motor 53 is rotation-controlled by the motor drive circuit board 43 shown in FIG. 8 brings a desired filter cassette 22 in position. As mentioned earlier, the light emitted from the mercury lamp 20 passes through the excitation filter 55 of the filter cassette 22 and the dichroic mirror 56 and irradiates as excitation light the sample S. The system for driving the stage 13 shown in FIG. 8 and the rotary filter cassette system of FIG. 9 are assembled to the front of the lower chassis 37, as understood from FIG. 10.

Figure 11:
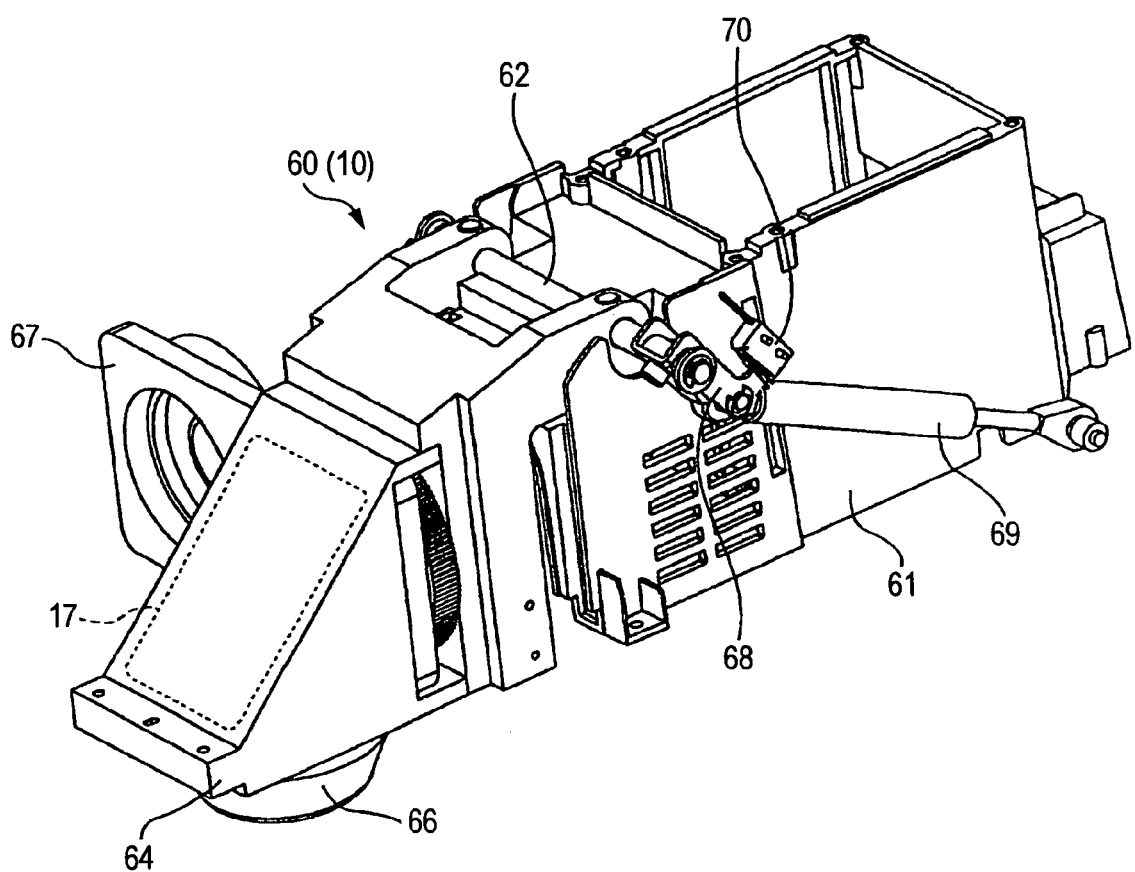
FIG. 11 is a perspective view showing the transmissive illumination unit where the flip-up mechanism of a heat insulation housing and an optical unit included in the transmissive illumination system is incorporated, with the optical unit in normal position.
Figure 12:
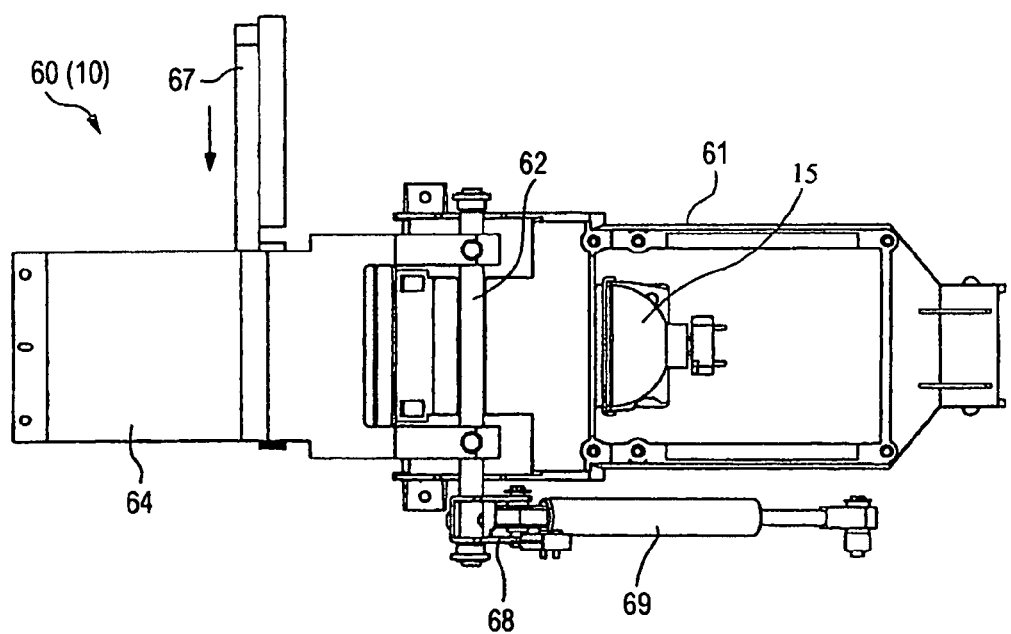
FIG. 12 is a plan view of the transmissive illumination unit shown in FIG. 11.

On the top end of the upper chassis 36 is mounted a unit 60 of the transmissive illumination system 10, in the widthwise center. FIG. 11 is a perspective view of the transmissive illumination unit 60. FIG. 12 is a plan view of the transmissive illumination unit 60. The transmissive illumination unit 60 comprises a transmissive illumination housing 61 extending horizontally. The transmissive illumination housing 61 accommodates a halogen lamp 15 and a heat absorption filter (not shown) arranged adjacent to the halogen lamp 15. On the top of the front end of the transmissive illumination housing 61 is provided a pivot shaft 62 extending in a direction transverse to the housing 61. To the pivot shaft 62 is attached a transmissive illumination optical unit 64. The transmissive illumination optical unit 64 can rotate upward about the pivot shaft 62. The transmissive illumination optical unit 64 includes a tilt mirror 17 and a condenser lens 66. The transmissive illumination optical unit 64 further has a plate 67 slidable widthwise. The user may manually operate the plate 67 to select a unit for phase observation and one for bright field observation.

Figure 13:
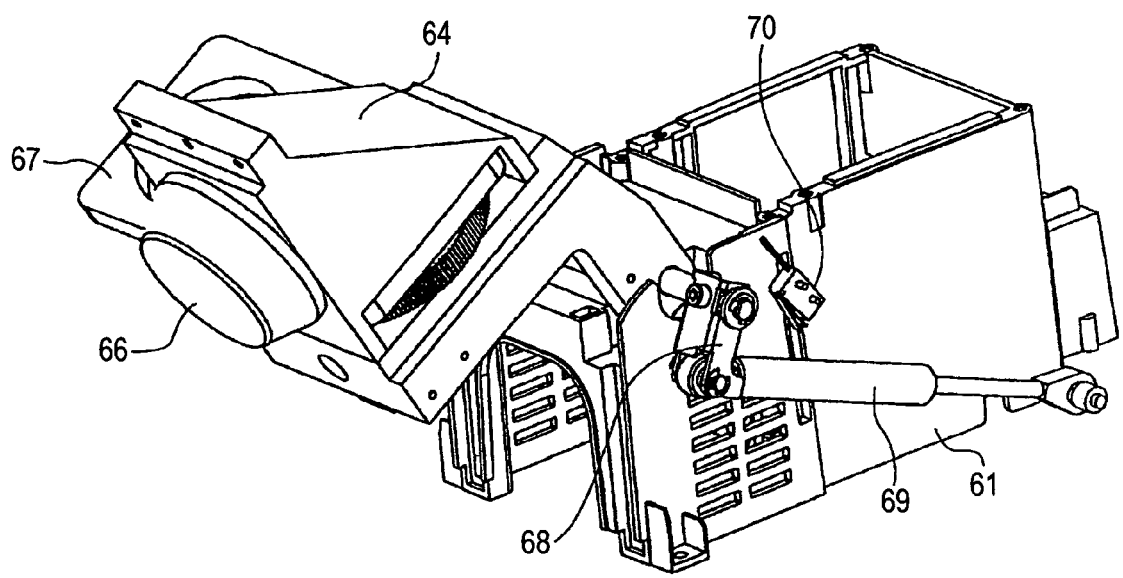
FIG. 13 is a perspective view corresponding to FIG. 11 that shows the state where the optical unit is flipped up.
Figure 14:
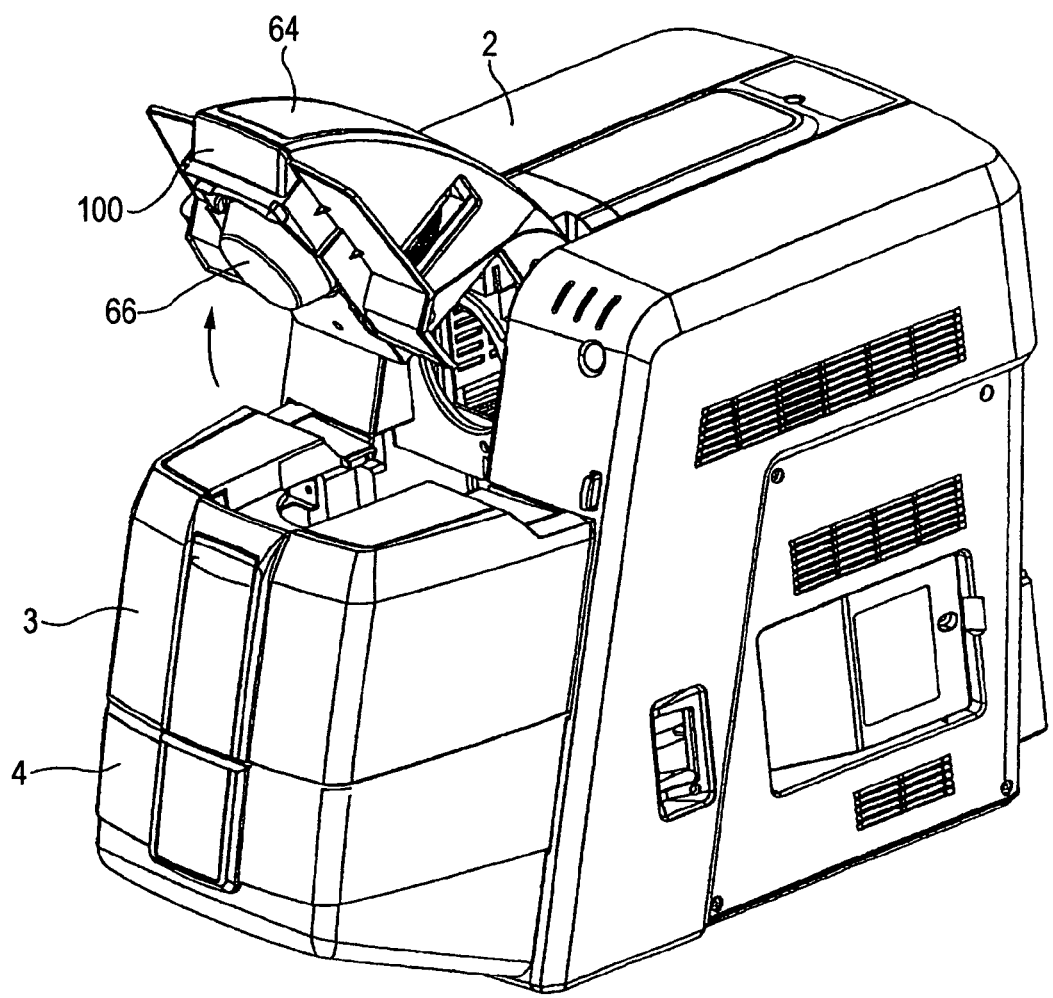
FIG. 14 is a perspective view corresponding to FIG. 1 of the external view of the fluorescence microscope according to the embodiment that shows the state where the optical unit is flipped up.

To one end of the pivot shaft 62 is attached a damper 69 via a link 68. The base end of the damper 69 is rotatably attached to the rear end of the transmissive illumination housing 61. When the user applies a force to lift up the transmissive illumination optical unit 64, the transmissive illumination optical unit 64 gently rotates upward by way of the damper 69 and takes the flip-up position tilted by approximately 45 degrees (FIGS. 13, 14). When the user applies a force to press down the transmissive illumination optical unit 64 in the flip-up position shown in FIGS. 13, 14, the transmissive illumination optical unit 64 gently rotates downward by way of the damper 69 and returns to the normal position shown in FIG. 11 and FIG. 1 corresponding to FIG. 11.

In this way, by arranging sideways the light source of the transmissive illumination system 10, the height dimension of the fluorescence microscope 1 is dramatically reduced. Also, retract operation of the transmissive illumination optical unit 64 by way of flip-up operation may be employed. By flipping up the transmissive illumination optical unit 64 to retract it upward from a normal position, it is possible to bring the transmissive illumination optical unit 64 away from the stage 13 or objective lens 28 without impairing the compactness of the small-sized fluorescence microscope 1 as well as maintaining the good external appearance.

Returning to FIGS. 11, 13, to the front end of the transmissive illumination housing 61 extending horizontally is fixed a proximity switch 70 facing the link 68. The proximity switch 70 works as a sensor for detecting the flip-up position and normal position of the transmissive illumination optical unit 64. Detecting the flip-up position (FIG. 13) of the transmissive illumination optical unit 64, the output signal from the proximity switch 70 forcibly turns off the halogen lamp 15 or reduces its light quantity to minimum.

When the transmissive illumination optical unit 64 takes the flip-up position (FIG. 14) approximately 45 degrees upward from the normal position, the transmissive illumination optical unit 64 is brought away from the stage 13 or objective lens 28. The user displaces the transmissive illumination optical unit 64 in the flip-up position as well as displaces downward the sample cover 3 detailed later to expose the stage 13, thereby facilitating insertion/retrieval of the sample S, or to be more specific, insertion/retrieval of a petri dish or a preparation carrying the sample S. The ring plate 13a equipped with a light aperture the objective lens 28 faces from below (refer to FIG. 10, for example) is detachable from the stage 13. In case the ring plate 13a is placed on the stage 13 together with a petri dish for positioning of the Petri dish accommodating the sample S, the transmissive illumination optical unit 64 is conveniently placed in the flip-up position.

By displacing the transmissive illumination optical unit 64 into the flip-up position to retract the flip-up position away from the objective lens 28, it is made easy to replace the objective lens 28 or clean the stage 13. When the transmissive illumination optical unit 64 is displaced from the normal position to the flip-up position, the transmissive illumination light source (halogen lamp) 15 is accordingly turned off in a forcible fashion or its light quantity is reduced to minimum. This prevents dazzling of the user who directly receives light from the halogen lamp 15.

Figure 15:
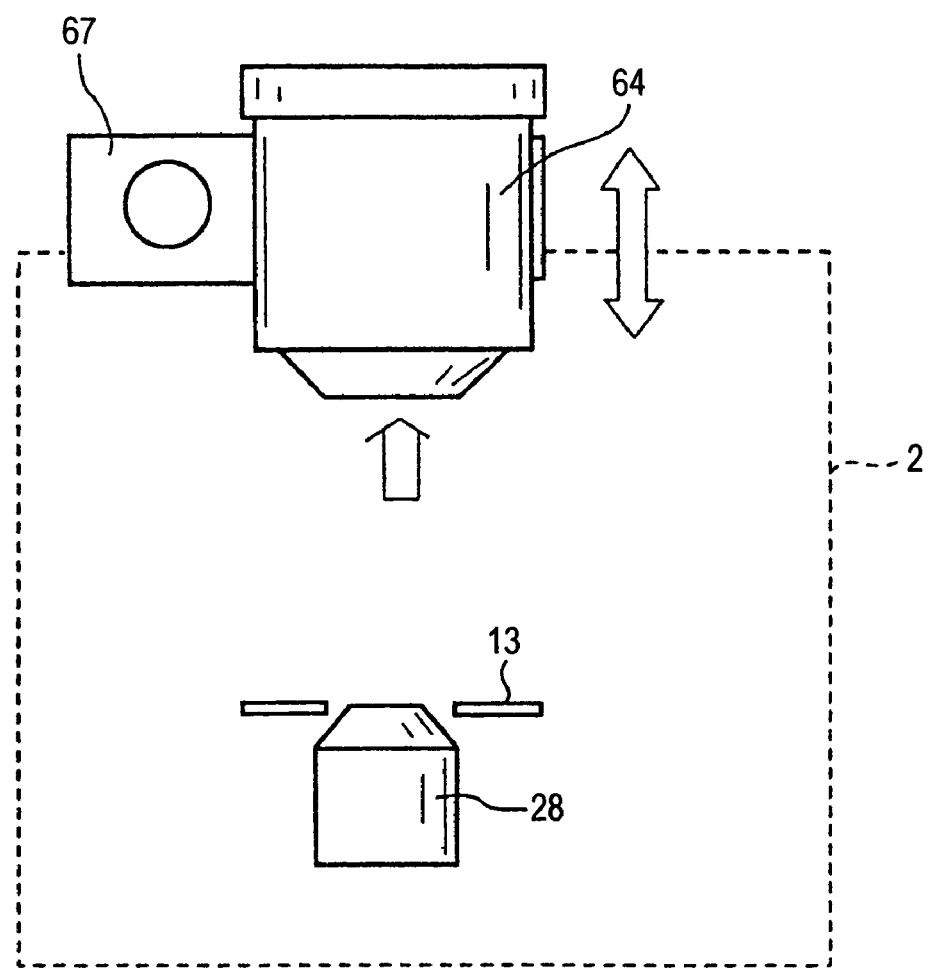
FIG. 15 illustrates a variation of the flip-up transmissive illumination optical unit disclosed in FIG. 11.
Figure 16:
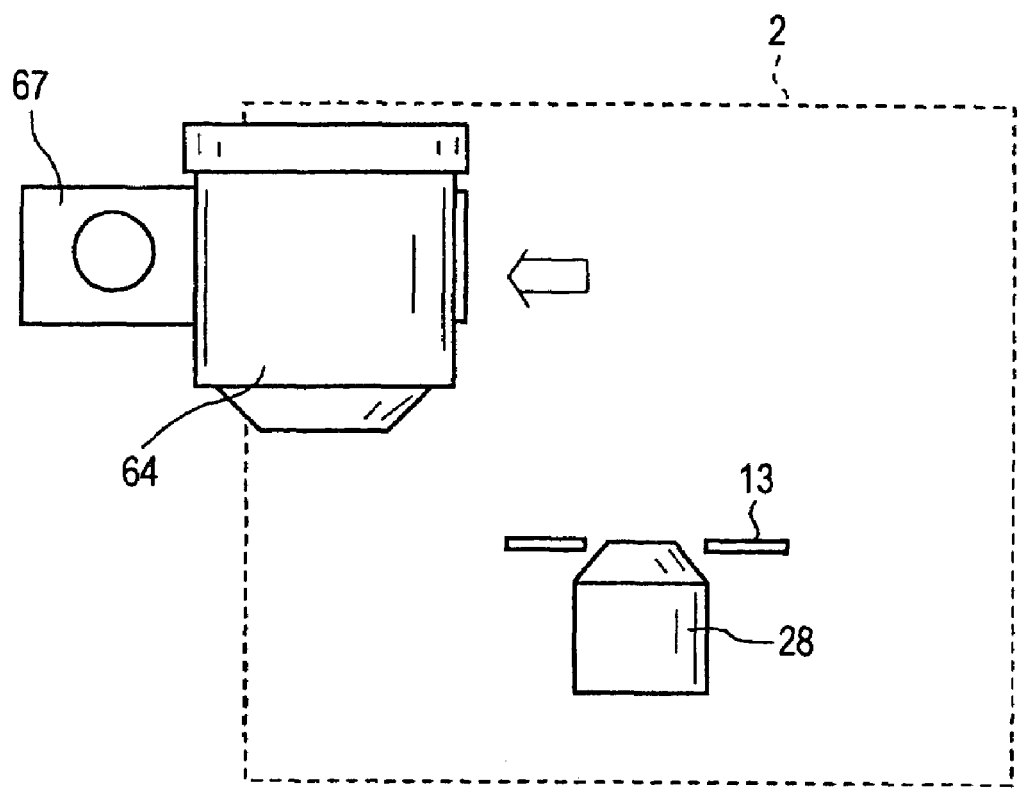
FIG. 16 illustrates another variation of the flip-up transmissive illumination optical unit disclosed in FIG. 11.

While the transmissive illumination optical unit 64 is rotated upward, the transmissive illumination optical unit 64 may be retracted from the normal position by sliding the transmissive illumination optical unit 64 along the front surface of the main unit case 2. FIG. 15 shows an example of retracting the transmissive illumination optical unit 64 upward in a linear fashion from the normal position. FIG. 16 shows an example of retracting the transmissive illumination optical unit 64 widthwise in a linear fashion from the normal position.

Figure 17:
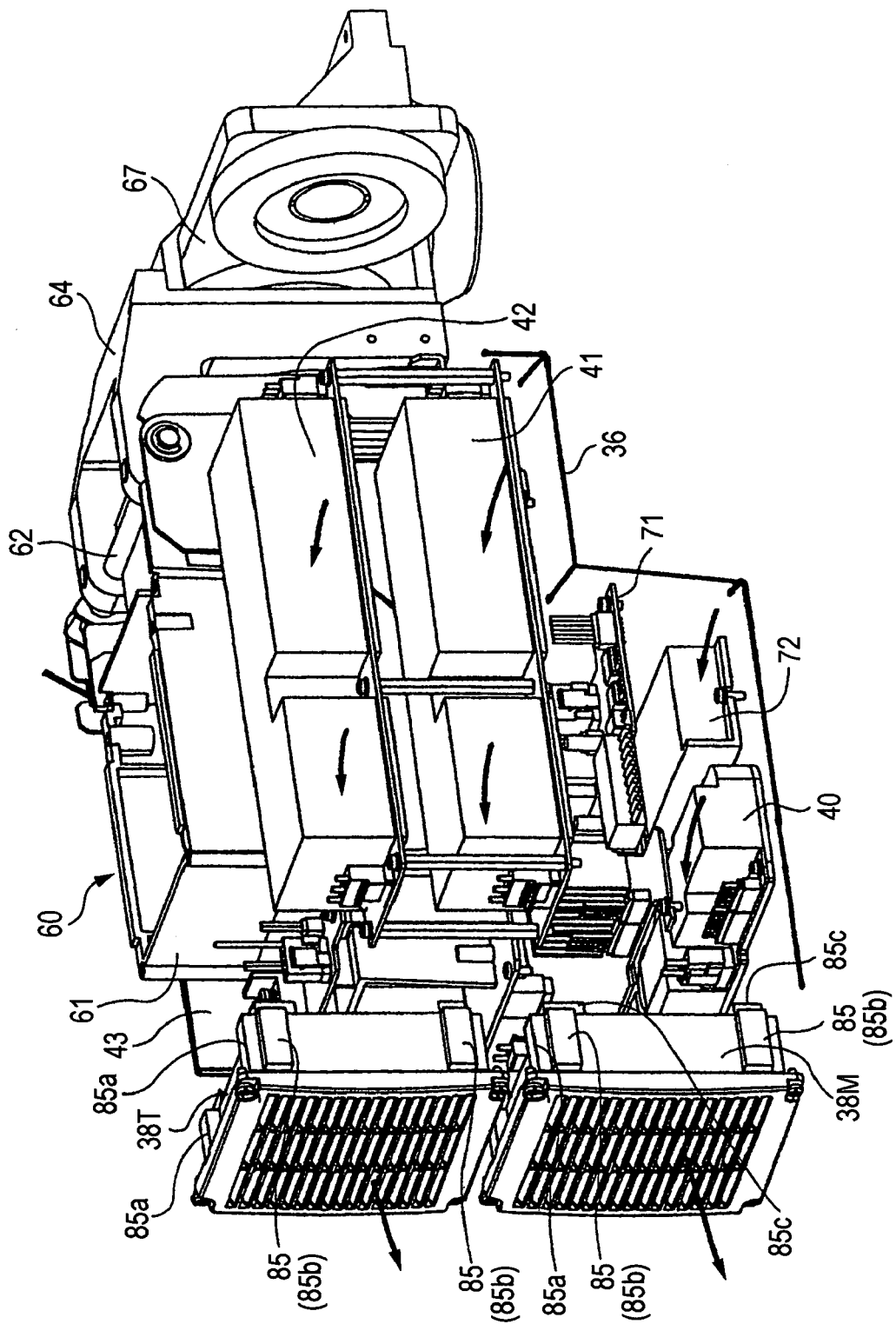
FIG. 17 illustrates the specific arrangement of the various power supply units incorporated into an upper chassis.
Figure 18:
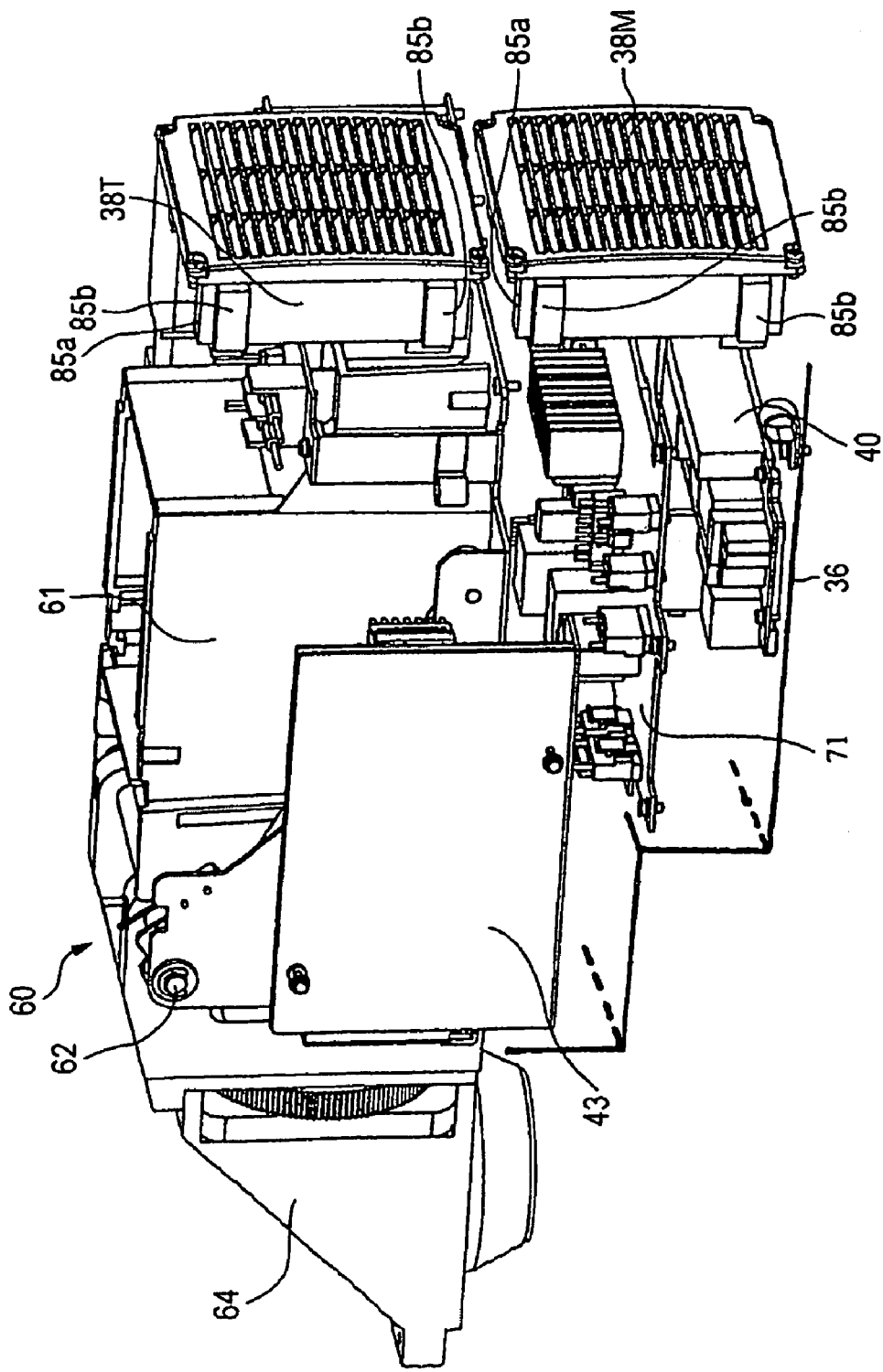
FIG. 18 illustrates the specific arrangement of the various power supply units and various boards incorporated into the upper chassis.
Figure 19:
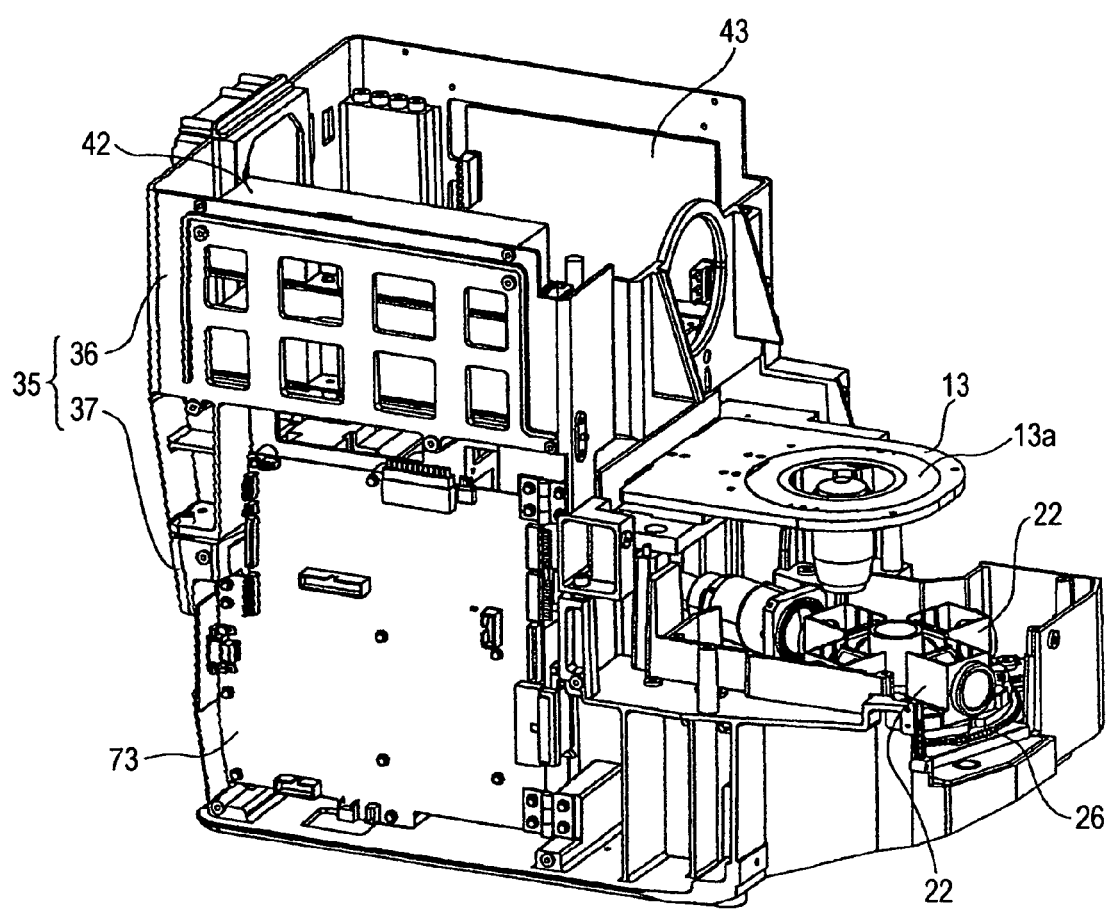
FIG. 19 shows a state where a controller is incorporated into a chassis.

On the side of the transmissive illumination housing 61 accommodating the halogen lamp 15 and a related heat absorption filter, that is, on the side of the upper chassis 36, are arranged a power supply unit for a halogen lamp 15 and a system power unit 42. On the upper chassis 36 are arranged a power supply board 71, a drive circuit 72 (see FIG. 23) for the z-axis drive motor for the stage 13, and a mercury lamp power supply unit 40, below the transmissive illumination housing 61 (see FIGS. 17 and 18). On the other hand, on the side of the lower chassis 37 is arranged a main control board (controller) 73 as understood from FIG. 19. The main control board 73 intrudes up to the upper chassis 36.

Figure 20:
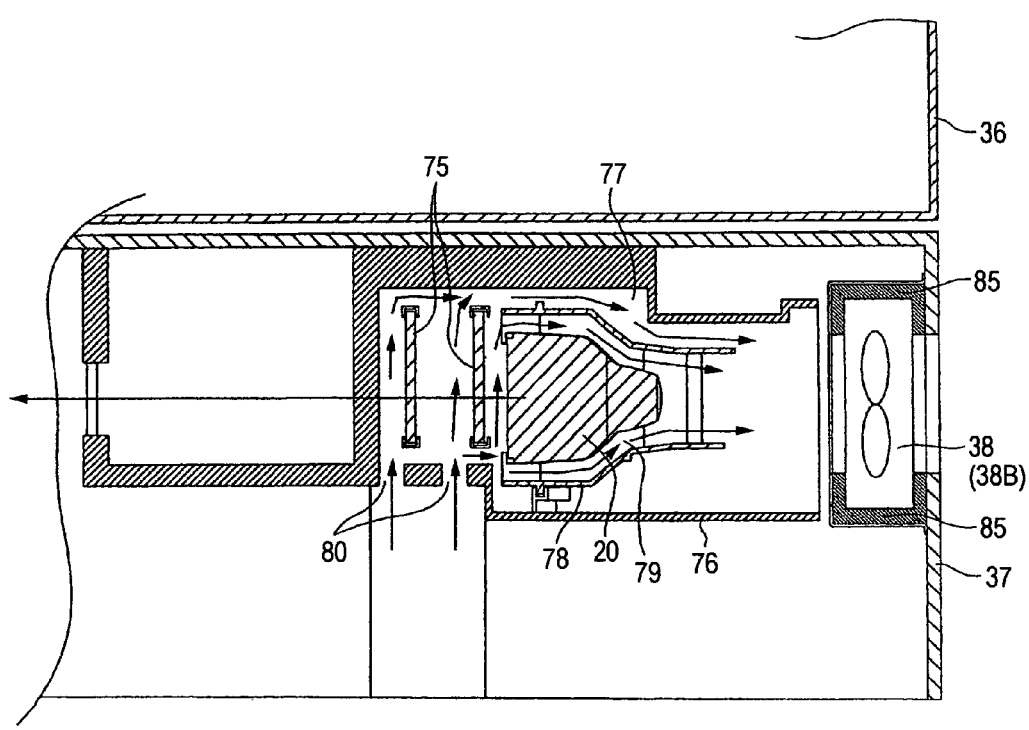
FIG. 20 illustrates a structure for forcibly air-cooling the light source included in the epi illumination system and the adjacent heat absorption filter.

FIG. 20 is a schematic view of the air-cooling structure of the epi illumination system 11. It is to be understood that the air-cooling structure is substantially the same in the transmissive illumination system 10.

The mercury lamp 20 as a light source of the epi illumination system 11 and a plurality of heat absorption filters 75 are accommodated in an epi illumination housing 76 made of a plastic material as a thermal insulation. The epi illumination housing 76 has an air cooling passage 77 extending backward from the heat absorption filter 75. The rear end of the air cooling passage 77 is open toward an electric fan unit 38 that is in the lowermost position.

Around the mercury lamp 20 are preferably provided a partition wall 78 having a cross section of a rectangle. The partition wall 78 forms a second air cooling passage 79 around the mercury lamp 20. The epi illumination housing 76 comprises an air inlet 80 in the area below the heat absorption filter 75. Air is introduced into the epi illumination housing 76 via the air inlet 80. The air that has flowed into the epi illumination housing 76 cools the heat absorption filter 75, passes through the main air cooling passage 77 and is exhausted to outside by the electric fan unit 38. The air introduced into the epi illumination housing 76 also passes through a second air cooling passage 79, cools the mercury lamp 20, passes through the main air cooling passage 77, and is exhausted to outside by the electric fan unit 38.

The heat absorption filter 75 whose heat absorption capability dissipates due to heat saturation and the mercury lamp 20 that becomes extremely hot are enclosed by the thermal insulation housing 76 so as to prevent the heat of the heat absorption filter 75 and the mercury lamp 20 from flowing into the chassis 35. While doing so, the heat in the thermal insulation housing 76 is forcibly exhausted outside together with the air introduced into the thermal insulation housing 76 by way of the electric fan unit n38. This prevents heat from the mercury lamp 20 from being carried to the sample S via the heat-saturated heat absorption filter 75, together with the light emitted by the mercury lamp 20, as well as from flowing into the chassis 35.

Concerning the cooling of the transmissive illumination system 10, the epi illumination system 11 or the heat absorption filter, a heat sink may be used. For example, a heat sink may be added to the heat absorption filter of the transmissive illumination system 10 or epi illumination system 11 in order to prevent heat saturation of the heat absorption filter 75.

The fluorescence microscope 1 of this embodiment has the mercury lamp 20 and various power supply units as heat sources enclosed by the main unit case 2. Thermal inflation of a chassis 35, for example, due to heat from internal components, could slightly change the focus or cause the living organisms of the sample S to fail or die. In order to cope with this, the fluorescence microscope 1 of this embodiment provides an electric fan unit 38 at the rear end of the chassis 35 and a vent 81 in the side face of the main unit case 2, as understood from FIG. 1. Hot air inside the main unit case 2 is thus exchanged with the external air flowing from the vent 81. The mercury lamp 20, the halogen lamp 15 and the related heat absorption filter 75 are enclosed by the thermal insulation housing 76, 61 so as to prevent heat from the mercury lamp and the like from flowing into the chassis 35 and purge the heat by using the electric fan unit 38. This provides air cooling of the mercury lamp 20 and the halogen lamp 15.

For a light source that becomes extremely hot, such as the mercury lamp 20, a second air cooling passage 79 is formed whose cross section area of the passage is relatively small is formed around the mercury lamp 20 by way of the surrounding partition wall 70. This lets air pass around the mercury lamp 20 at a relatively high speed, which exhausts to outside a huge amount of heat emitted by the mercury lamp 20.

The heat absorption filter 75 related to the mercury lamp 20 is similarly air-cooled. This prevents the heat absorption capability of the heat absorption filter 75 from being dissipated or lowered by heat, and also prevents the heat generated by the heat saturation of the heat absorption filter 75 from being delivered to the sample S together with the light emitted by the mercury lamp 20.

While three electric fan units 38 are attached to the rear end face of the main unit case 2 in the embodiment, the three electric fan units 38 are mounted on the main unit case 2 via a plurality of gel or rubber vibration damping members 85 (i.e., 85a, 85b, 85c). In the related art, it was a common practice not to provide an electric fan unit as a vibration source in equipment where vibration is extremely avoided. By interposing the vibration damping member 85, it is possible to prevent the vibration caused by the electric fan unit 38 from being transmitted to the chassis 35. The electric fan unit 38 is preferably a unit of a relatively low rpm, such as 3000 rpm.

Figure 21:
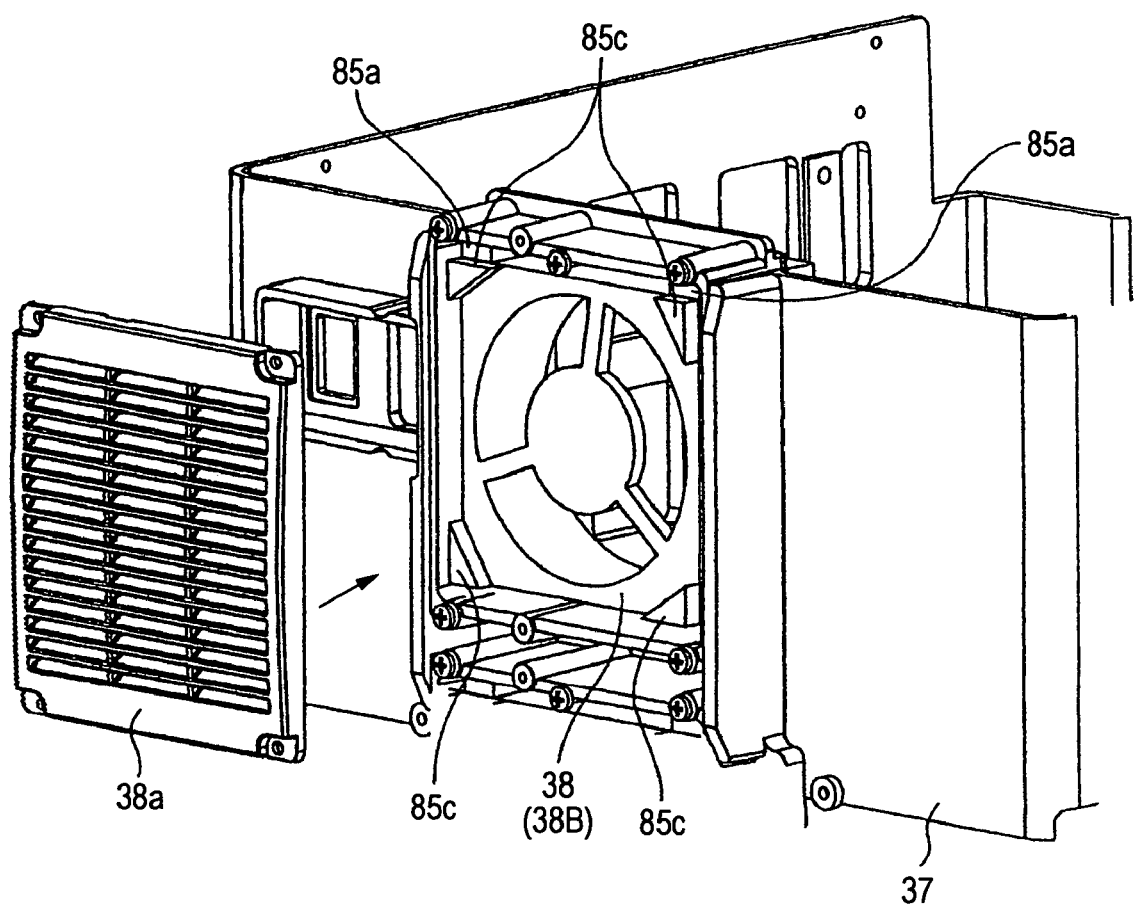
FIG. 21 illustrates an electric fan unit assembled to the rear end face of the chassis and the related vibration damping member.

Concerning the vibration damping member 85, in order to absorb the vibration of each component in vertical, horizontal and back-and-forth directions of the electric fan unit 38, it is preferable to provide first vibration damping members 85a (FIG. 17) on the top face and bottom face of the electric fan unit 38, second vibration damping members 85b (FIG. 17) on the side faces of the electric fan unit 38, and third damping members 85c (FIG. 21) on the front and/or rear faces of the electric fan unit 38. That is, the vibration damping members 85 are provided between the electric fan unit 38 and the associated fan cover 38a and between the electric fan unit 38 and the chassis 37.

Figure 22:
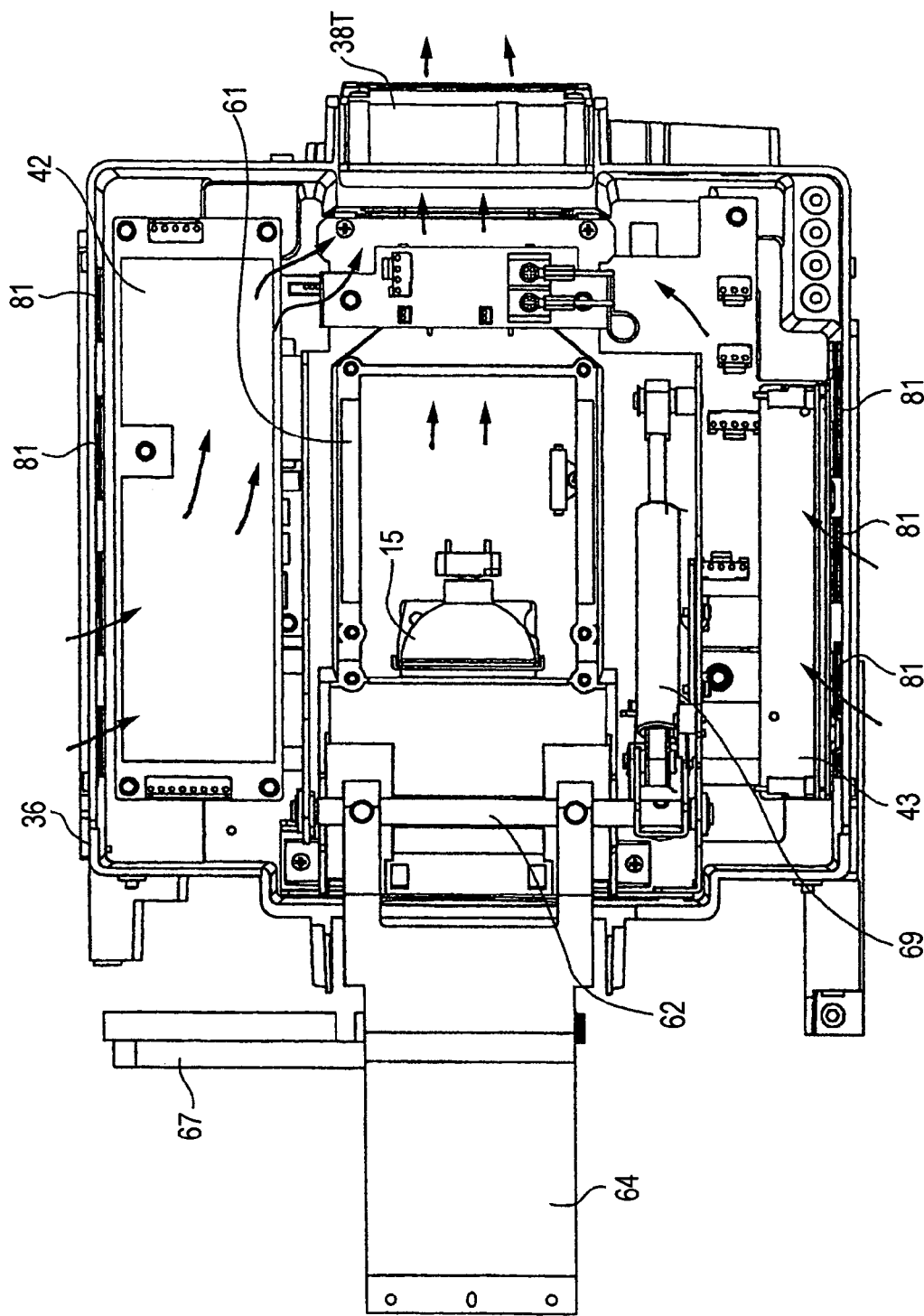
FIG. 22 is a plan view illustrating forced air cooling of the top portion of the upper chassis.

Three electric fan units mounted in vertical alignment on the rear face of the fluorescence microscope 1 in this embodiment will be called a top fan 38T, a middle fan 38M and a bottom fan 38B. As understood from the air flow indicated by an arrow in FIG. 22, the top fan 38T contributes to air cooling of the top portion of the upper chassis 36, such as air cooling of the halogen lamp 15 for transmissive illumination and its related heat absorption filter as well as the halogen power supply unit 42.

Figure 23:
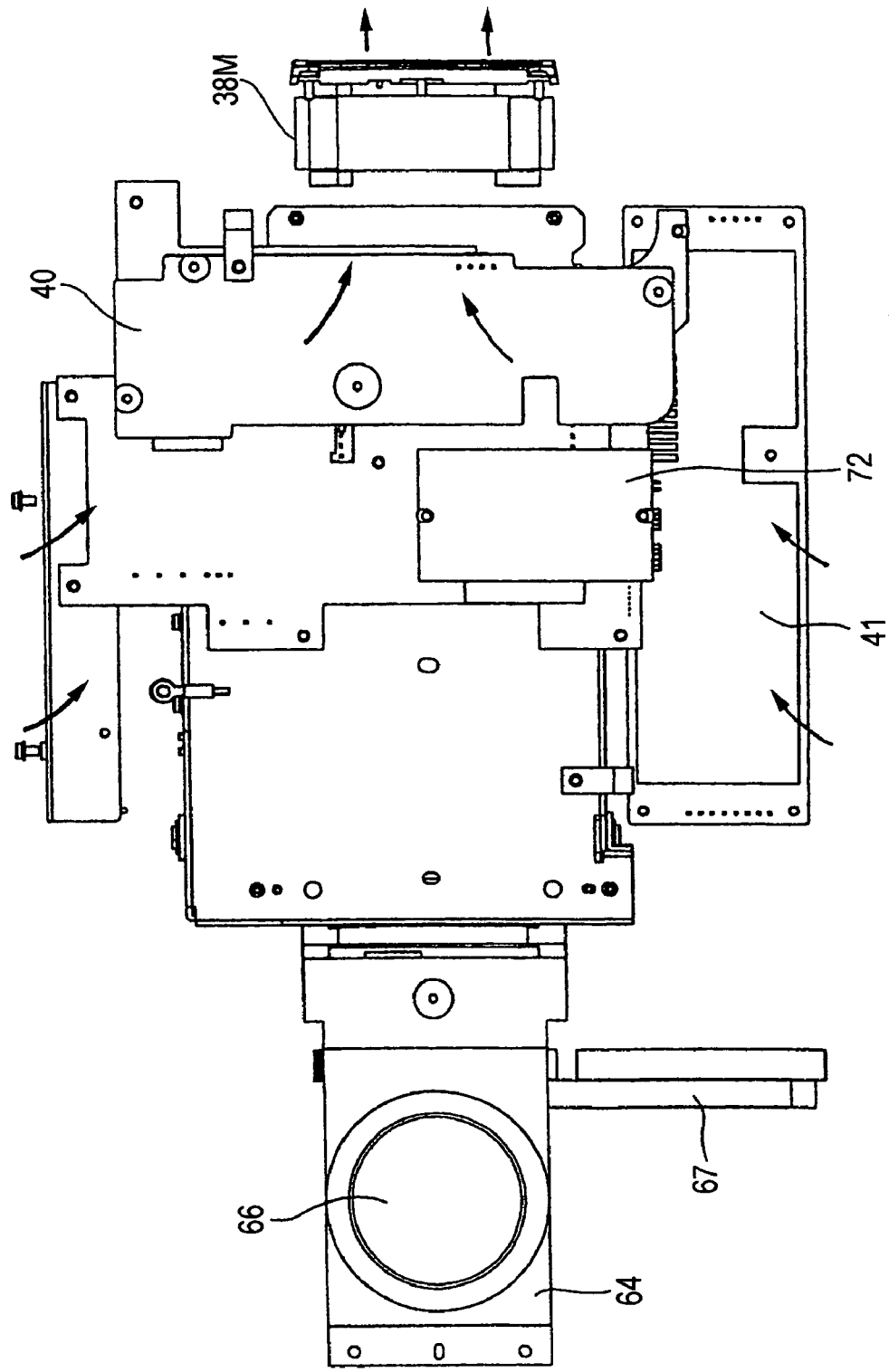
FIG. 23 is a plan view illustrating forced air cooling of the bottom portion of the upper chassis.

As understood from the air flow indicated by an arrow in FIG. 23 as a bottom view of the upper chassis 36 seen from below, the middle fan 38M contributes to air cooling of the bottom portion of the upper chassis 36 where a mercury lamp power unit 40 and a system power supply unit 41 are arranged.

As understood from the air flow indicated by an arrow in FIG. 20, the top fan 38T contributes to air cooling of the mercury lamp 20 and its related heat absorption filter 75 arranged on the lower chassis 37.

As a variation, it is possible to configure the top fan 38T and the middle fan 38M into a common fan and use the common fan to perform forced air cooling of the top and bottom portions of the upper chassis 36.

The main control board (controller) 73 is enclosed by the chassis 35, which ensures noise resistance.

The aforementioned sample cover 3 can be displaced downward along the outer surface of the lower cover below. The sample cover 3 may have a width W1 (FIG. 24) slightly greater than the width W2 of the lower cover 4. The sample cover may have a cross section whose shape is "C" in alphabet enclosing the sides and front of the stage 13. The sample cover may have a shape similar to that of the lower cover 4 and may have a cross section slightly greater than that of the lower cover 4. As a variation, as long as the lower cover 4 has a cross section in an arc as a convex facing forward, the sample cover 3 may have a cross section similar to and slightly greater than that of the lower cover 4.

Figure 26:
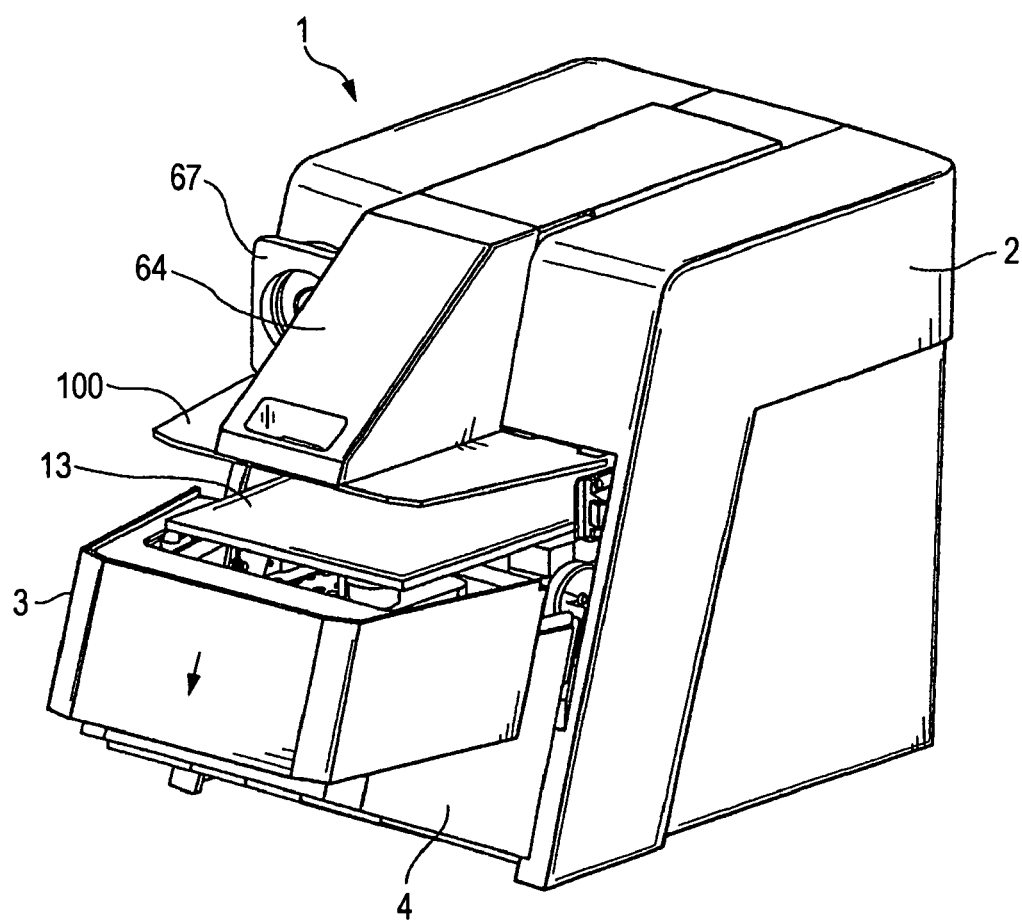
FIG. 26 illustrates the state where the sample cover of the fluorescence microscope according to the embodiment is displaced downward to expose a stage.

The sample cover 3 can be displaced along the front face and side faces of the lower cover 4 (FIG. 26). With the sample cover 3 displaced downward, the front face and side faces of the stage 13 are exposed. This allows a sample S to be set to the stage 13 or retrieve the sample S placed on the stage 13. In this practice, the transmissive illumination optical unit 64 may be rotated to the flip-up position shown in FIG. 14 as required.

Figure 24:
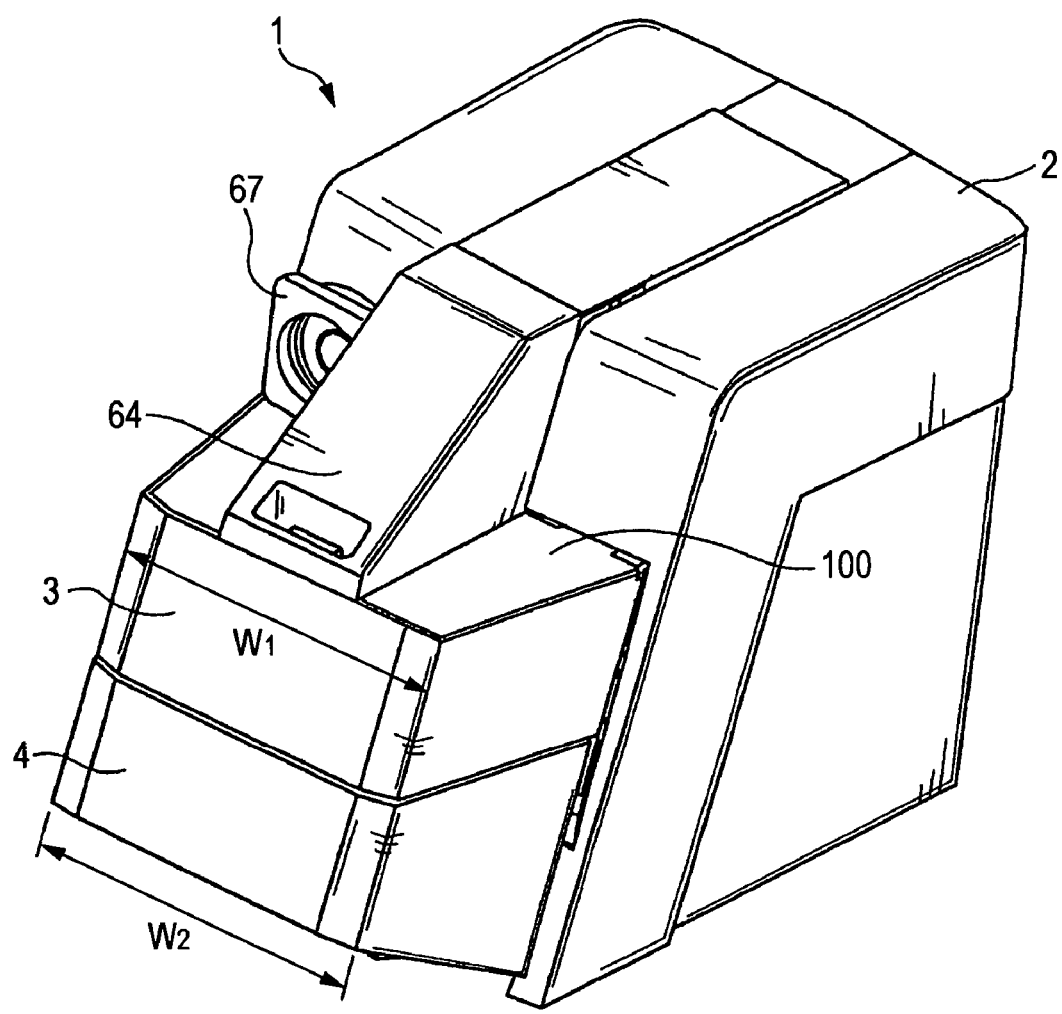
FIG. 24 illustrates a sample cover included in the fluorescence microscope according to the embodiment.
Figure 25:
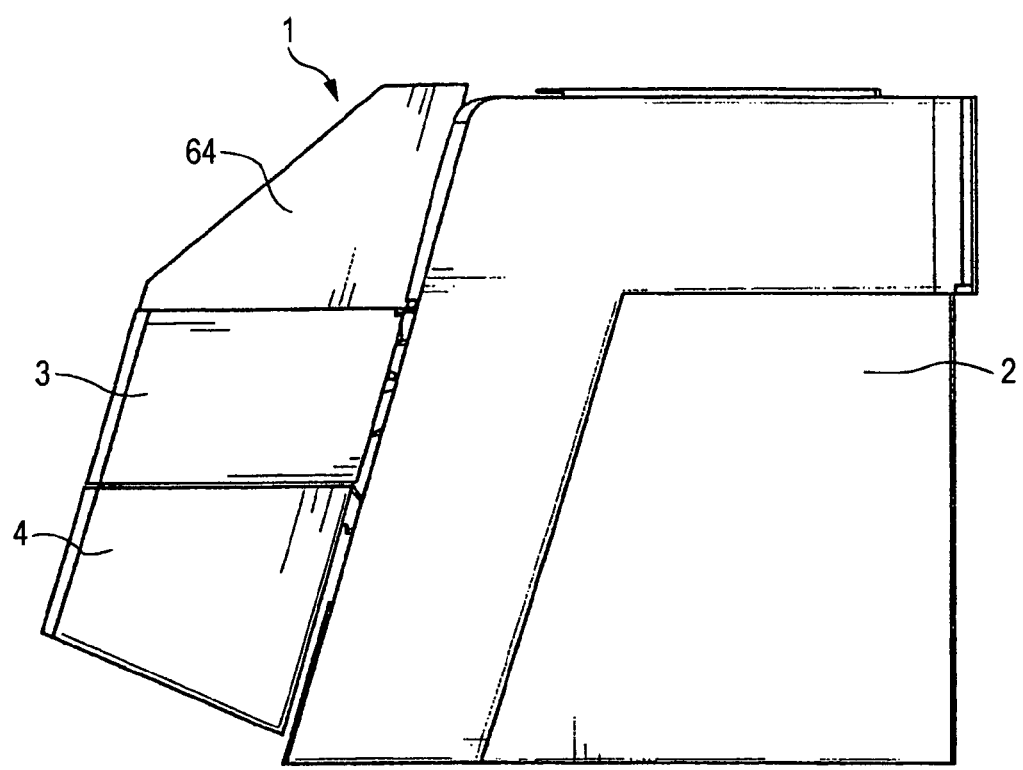
FIG. 25 is a side view corresponding to FIG. 24 of the fluorescence microscope according to the embodiment.

The sample cover 3 and the lower cover 4 each preferably comprises across section of a trapezoid, the front width being smaller than the rear width as seen from above, as understood from FIG. 24. In the illustrated example, the sample cover 3 and the lower cover 4 each has a cross section of a trapezoid, the front width being approximately 220 mm and the rear width being approximately 280 mm as seen from above. That is, the sample cover 3 and the lower cover 4 each comprises tapered sides that are tapering toward the front. Thus, by once moving the sample cover 3 forward and downward and moving downward along the outer surface of the lower cover 4 in front of the lower cover 4, by way of the parallel link structure described below, it is possible to descend the sample cover 3 along the front surface of the lower cover 4 without the sample cover 3 interfering with the lower cover 4. The sample cover 3 has the same external shape as the lower cover 4, which improves external appearance of these covers.

Figure 27:
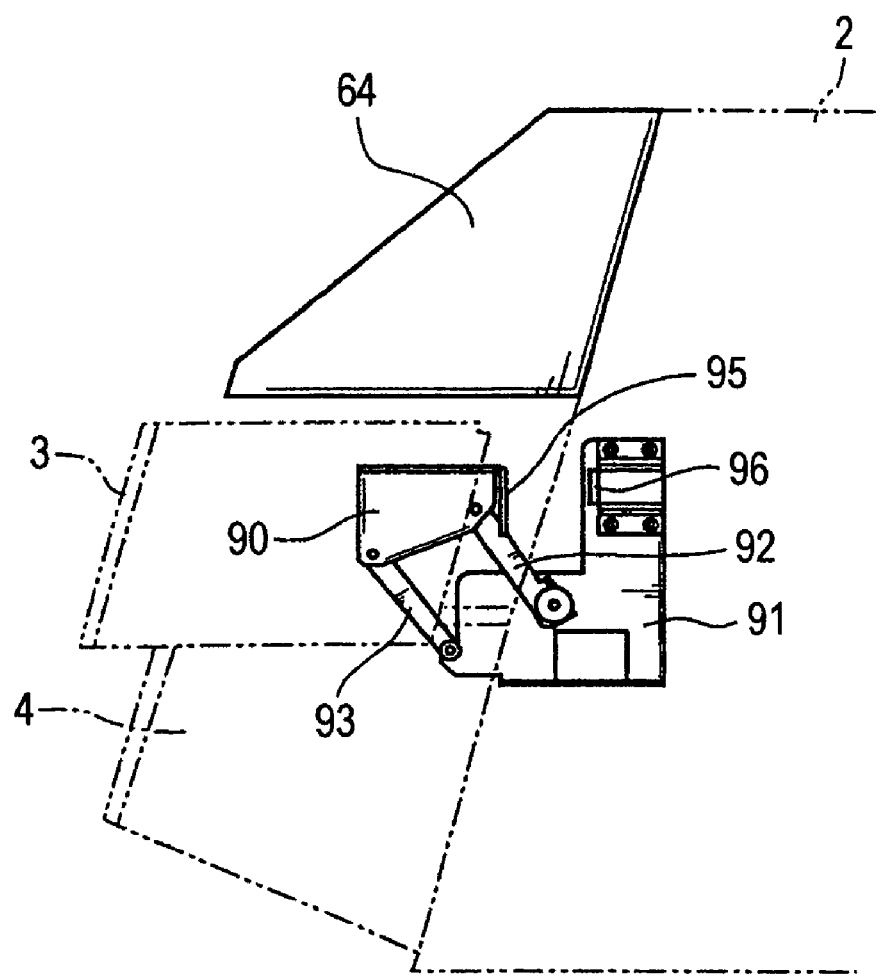
FIG. 27 illustrates a mechanism for displacing the sample cover downward.

As shown in FIG. 27, the sample cover 3 is linked to the main unit case 2 by upper and lower links 92, 93 parallel to each other, provided between a first bracket 90 provided at the rear end of its both sides and a second bracket 91 provided at the front end of the main unit case 2. By using the parallel links 92, 93, the sample cover 3 can move up and down along the front surface and both sides of the lower cover 4 while being translated.

Figure 28:
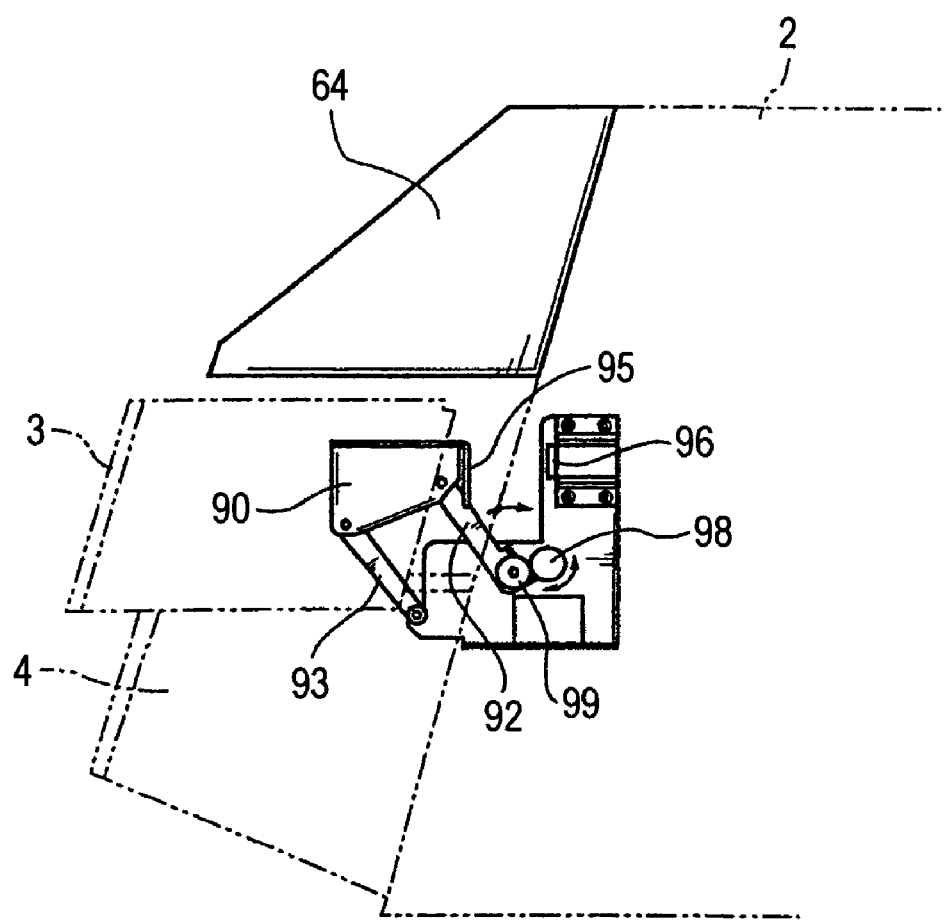
FIG. 28 illustrates automated opening/closing of the sample cover by incorporating an electric motor into the mechanism for displacing the sample cover downward in relation to FIG. 27.

Referring to FIGS. 27 and 28, the first bracket 90 comprises a metal piece 95 extending along the rear end edge. The second bracket 91 is provided with a permanent magnet 96 at a position that faces the metal piece 95 when the sample cover 3 is closed. Thus, when the sample cover 3 is displaced upward and the stage 13 is shielded, the metal piece 95 is stuck to by the permanent magnet 96 and the closure position of the sample cover 3 is maintained by the magnetic force of the permanent magnet 96.

While the sample cover 3 described referring to FIG. 27 above is manually opened/closed, the sample cover 3 may be opened/closed with a motor-driven mechanism by providing an electric motor 98 (see FIG. 28) at the second bracket 91 on the main unit case 2, linking the electric motor 98 for example with the upper link 92 by using a gear 99, and rotating the motor in forward or backward directions.

When the sample cover 3 takes the upper position, the upper area of the sample cover 3 is covered by a canopy plate 100, which places the stage 13 and its surroundings into the darkroom state. While the canopy plate 100 extending horizontally is fixed at the bottom end of the transmissive illumination optical unit 64 in the embodiment, it may be detachably mounted on the main unit case 2 in the variation.

Detachably mounting the canopy plate 100 advantageously applies to a case where strict lightproof environment is not required depending on the type of a sample S and the sample cover 3 alone is positioned in the upper position or closed in the absence of the canopy plate 100 so that an image of the sample S is captured in the semi-darkroom state.

As mentioned above, the sample cover 3 is moved vertically along the surface of the lower cover 4. Thus, even when the sample cover 3 is opened and the stage 13 is exposed, the sample cover 3 overlaps with the lower cover 4 in back-and-forth directions, so that the open sample cover 3 does not narrow the work space of the user.

Figure 29:
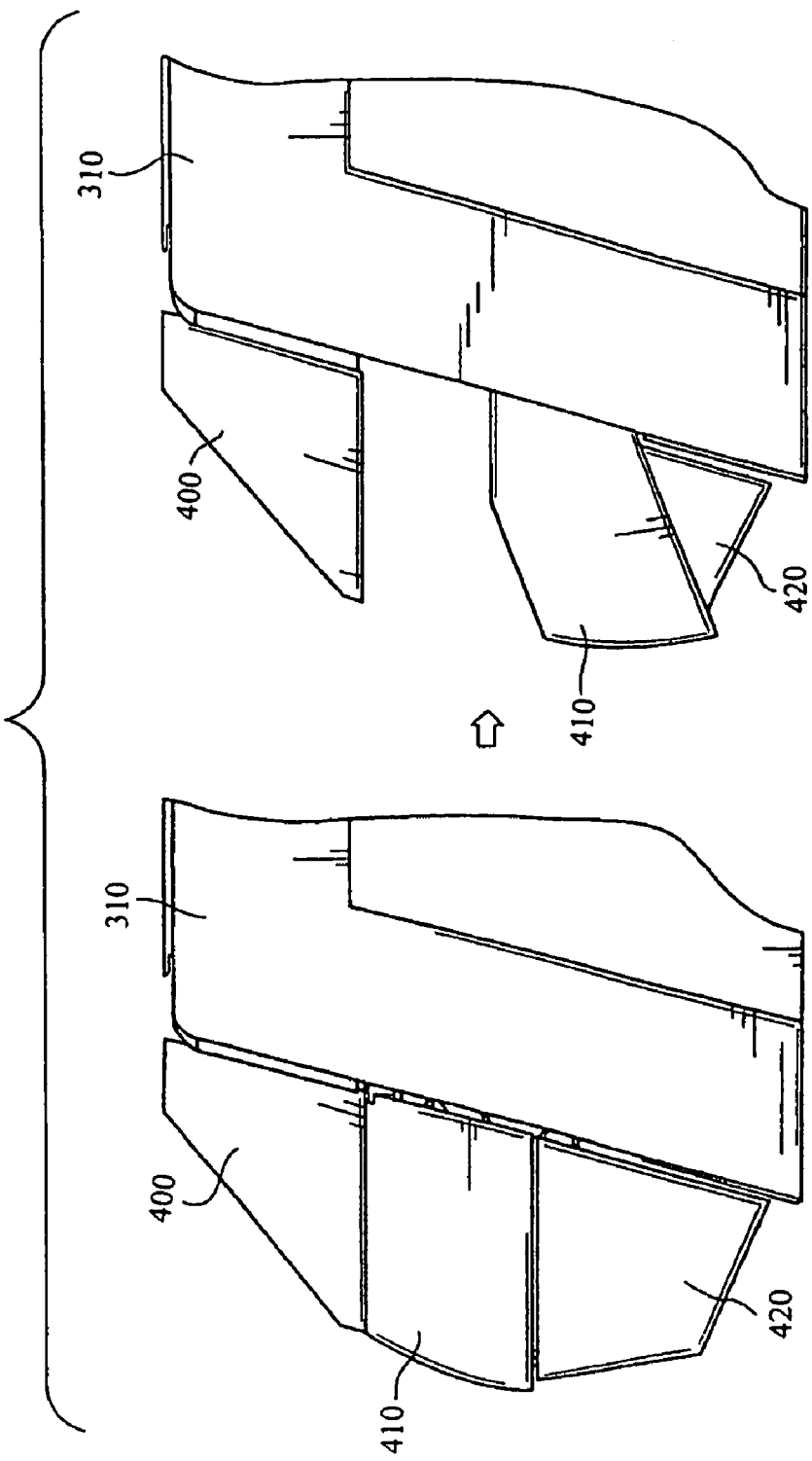
FIG. 29 illustrates a variation of a method for displacing the sample cover downward.

As a variation of the embodiment shown in FIG. 26, the sample cover 3 may be displaced upward to expose the stage 13. As shown in FIG. 29, the stage 13 may be exposed by causing the sample cover 410 to perform arc operation downward, where transmissive illumination optical unit 400, lower cover 420, and main unit case 310 are also shown in this figure.

Figure 30:
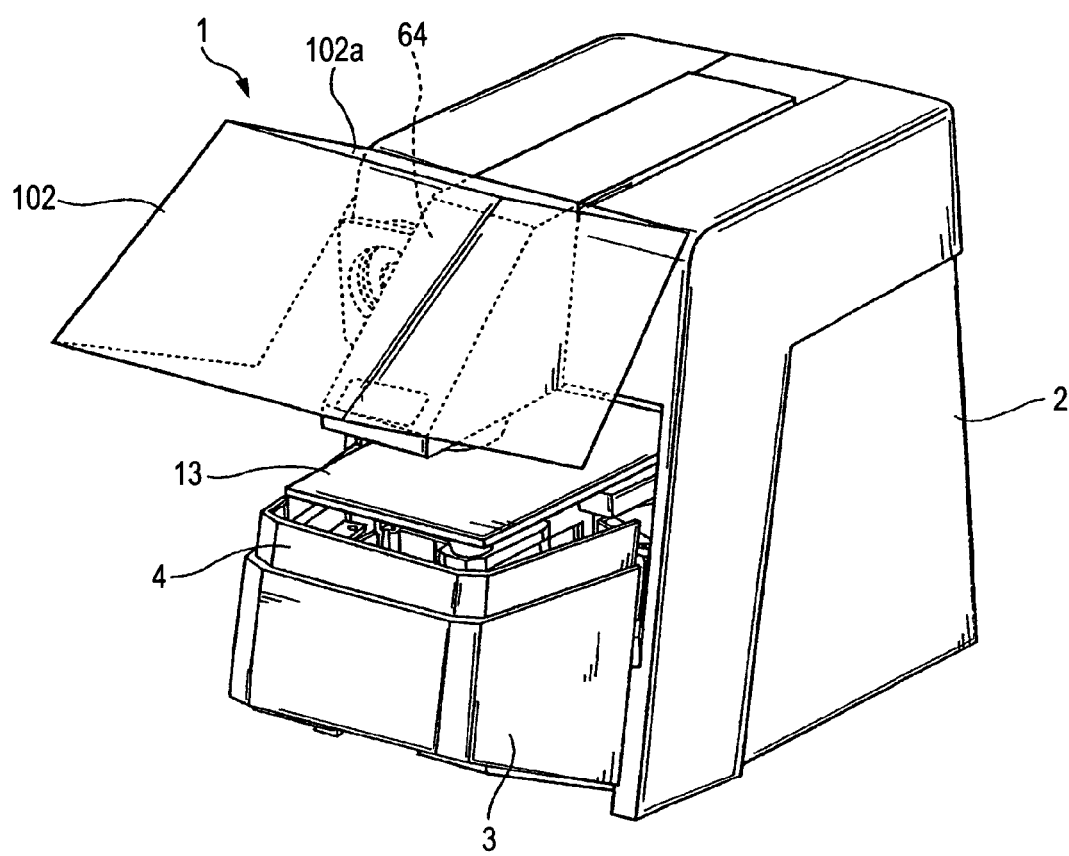
FIG. 30 illustrates an example where the upper area of the stage is covered by a retractable lid instead of a sample cover.

As shown in FIG. 30, a configuration is possible where a lid 102 is provided to cover the entirety of top area of the lower cover 4 and the rear end edge of the top 102a of the lid 102 is hinged to the main unit case 2 in order to open/close the lid 102.

Figure 31:
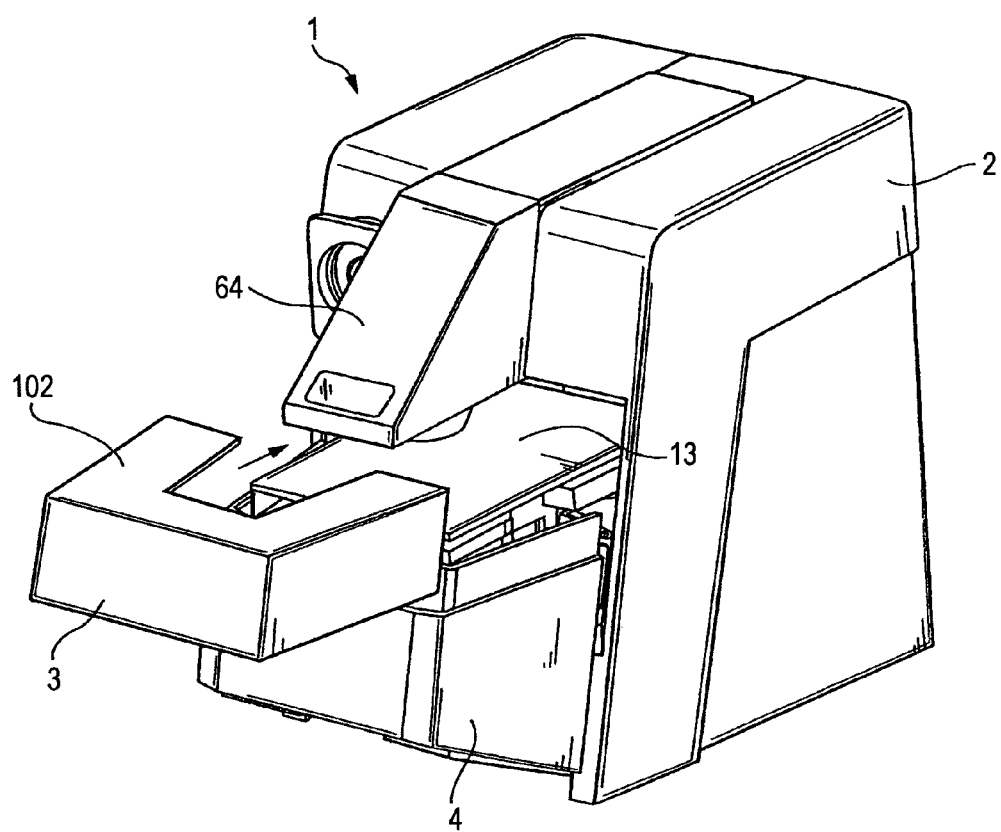
FIG. 31 illustrates an example where the stage is exposed with the sample cover displaced forward.

As shown in FIG. 31, the sample cover 3 with the top 102a integrated may be inserted/removed at the front of the stage 13. That is, a configuration is possible where the sample cover 3 with the top 102a is detachably provided on the main unit case 2 from the front and the sample cover 3 is pulled out of the main unit case 2 when the sample S is extracted/inserted thereby exposing the stage 13.

Figure 32:
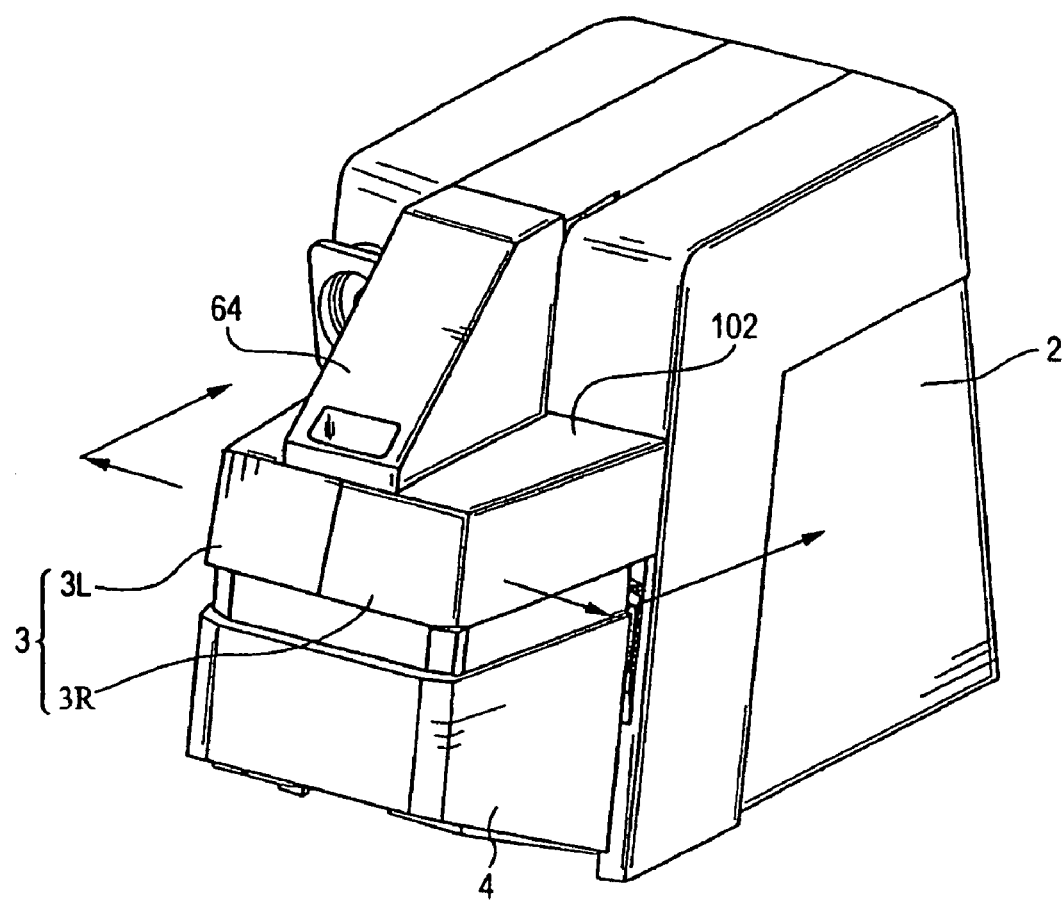
FIG. 32 illustrates an example where the sample cover split into two cover segments sideways is once displaced transversely and then backward in order to expose the stage.

As shown in FIG. 32, a configuration is possible where the sample cover 3 is split into a left split cover 3L and a right split cove 3R and, when the stage 13 is exposed, the left split cover 3L is once displaced leftward and the right split cover 3R is once displaced rightward, then the covers are displaced backward along the side faces of the main unit case 2.

Figure 33:
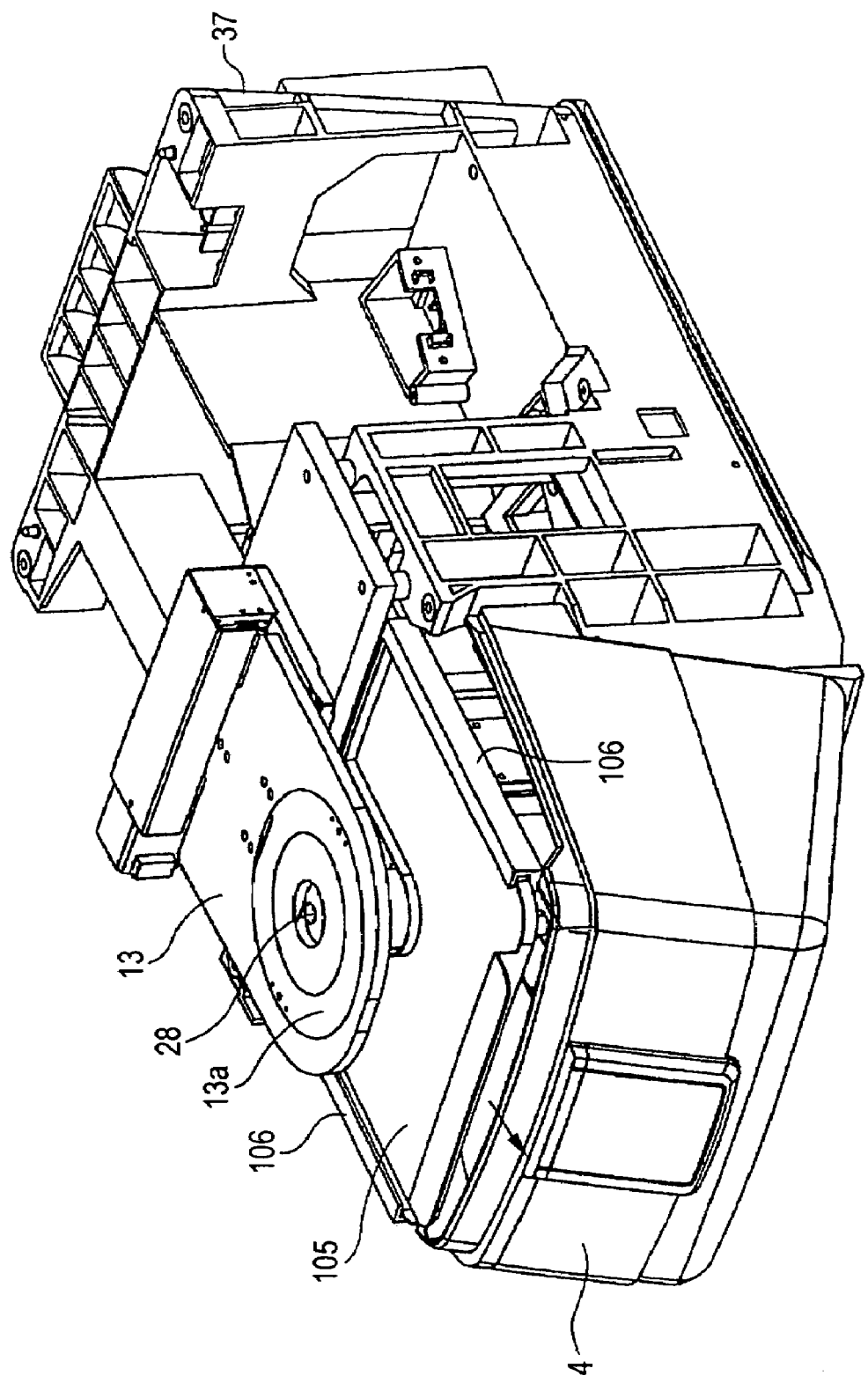
FIG. 33 is a perspective view illustrating an example where a tray that can be inserted/drawn in back-and-forth directions is arranged in order to prevent contamination of the area below the stage, with the tray arranged below the stage.
Figure 34:
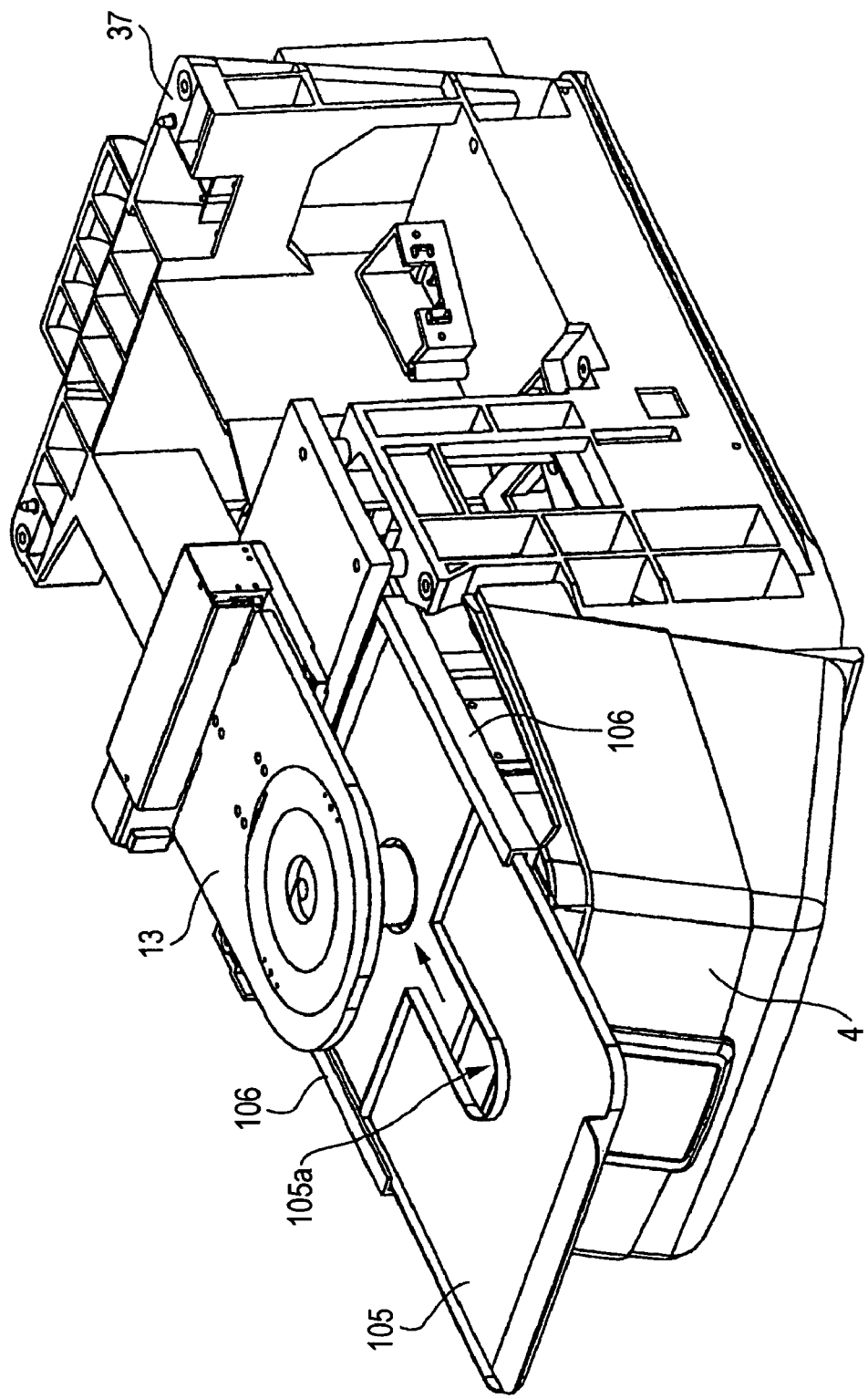
FIG. 34 is a perspective view illustrating an example, with relation to FIG. 33, where the tray that can be inserted/drawn in back-and-forth directions is arranged in order to prevent contamination of the area below the stage, with the tray drawn out from below the stage.

As shown in FIGS. 33, 34, an optional configuration is possible where a rectangular horizontal tray 105 larger than the stage 13 is provided below and adjacent to the stage 13 and the both edges of the side faces of the horizontal tray 105 are slidably engaged with a horizontal guide rail 106 extending in back-and-forth directions so as to allow the horizontal tray 105 to be removed forward. On the horizontal tray 105, a slit 105a (having a width substantially the same as the diameter of the objective lens 28) extending in back-and-forth directions on the side where interference with the objective lens 28 may take place, in order to avoid interference with the objective lens 28, as understood from FIGS.

33, 34. This allows the horizontal tray 105 to be placed in a more inner position than the objective lens 28.

By providing a detachable horizontal tray 105 below the stage 13, it is possible to prevent, for example, a sample culture solution or sample S from dropping via the light aperture in the stage 13 directly below the stage 13 and contaminating a member in the area below the stage 13, for example the objective lens 28. By providing a horizontal tray 105, the horizontal tray catches any dropping culture solution. It is thus possible to remove the sample S by simply drawing the horizontal tray 105. This prevents contamination of the objective lens 28 thereby improving the ease of maintenance of the fluorescence microscope 1.

As understood from the above description, the fluorescence microscope 1 of the embodiment arranges sideways the light source 15 of the transmissive illumination system 10 and provide the transmissive illumination system 10 with a tilt mirror 17 to refract the transmissive illumination light thus dramatically reducing the height dimension of the fluorescence microscope 1. Inside the main unit case 2 are densely mounted the imaging system 12, transmissive and epi illumination systems 10, 11 as well as all the associated power supply units 40, 41, 42, the power supply board 71, and the controller board 73. Such a layout of the fluorescence microscope has not been encountered. The fluorescence microscope 1 of the embodiment features the V-shaped arrangement of the epi illumination system 11 and the imaging system 12, the power supply units 40 through 42 arranged in the clearance between the transmissive illumination system 10 and the epi illumination system 11 whose power supplies 15, 20 are arranged sideways. Such an innovative arrangement has contributed to reduction in the overall dimensions, in particular the height dimension.

For example, in case the power supply units 40 through 42 are arranged below the imaging system 12, the height dimension of the fluorescence microscope 1 increases and the problem of heat rising from the power supply units 40 through 42 occurs. In case the power supply units 40 through 42 are arranged on the sides of the transmissive illumination system 10 and the epi illumination system 11, the width dimension of the fluorescence microscope increases.

According to the fluorescence microscope 1 where the power supply units 40 through 42 are arranged in the clearance between the transmissive illumination system 10 and the epi illumination system 11, the width dimension and the height dimension can be reduced as mentioned above. The heat from the power supply units 40 through 42 rises. This minimizes the influence of heat from the power supply units 40 through 42 on the epi illumination system placed below the power supply units for which heat countermeasures are required most.

The chassis 35 is split into an upper part and a lower part. The power supply units 40 through 42 are mounted on the upper chassis 36 while the epi illumination system 11 enclosed by the heat insulation housing 76 with air-cooling measures are mounted on the lower chassis 37. This minimizes the thermal expansion of the lower chassis 37. Moreover, a unit including the objective lens 28 and the stage 13 is assembled to the lower chassis 37. This prevents the objective lens 28 from going out of focus in prolonged fluorescence observation.

The fluorescence microscope 1 according to the embodiment employs, as mentioned above, the transmissive illumination system 10 equipped with the light source 15 provided sideways and arranges the epi illumination system 11 and the imaging system 12 in the shape of V as seen from above. The main unit case 2 having a minimum volume required to enclose the three fundamental components features an unprecedented compactness, as those skilled in the art will readily appreciate. Further, those skilled in the art will be surprised at the configuration where the imaging system 12, the transmissive and epi illumination systems 10, 11 as well as the power supply units 40 through 42 as a heat source and the power supply board 71 are arranged inside the main unit case 2 that is in particular small in the height dimension. This is virtually impossible unless sophisticated heat countermeasures are taken. For the heat countermeasures, the related art fluorescence microscopes have avoided use of an electric fan although the invention intentionally employs the electric fan 38 to perform forced ventilation. The halogen lamp 15 and the mercury lamp 20 that generates a huge amount of heat are enclosed by the heat insulation housings 61, 76 in order to confine the heat emitted from the lamps 15, 20 and exhaust to outside the huge amount of heat in the heat insulation housings 61, 76 by using the electric fan 38. Similarly, the heat absorption filter 75 related to the lamps 15, 20 is enclosed by the heat insulation housings 61, 76 in order to perform air-cooling of the filter by way of the flow of air generated by the electric fan 38 related to the heat insulation housings 61, 76, thereby preventing heat saturation of the heat absorption filter 75.

The inside of the main unit case 2 is designed in three vertical layers. The bottom electric fan 38B is provided for the epi illumination system 11 and the imaging system 12 positioned in the bottom layer. The middle electric fan 38M is provided for the power supply units 40 through 42 positioned in the middle layer. The top electric fan 39T is provided for the transmissive illumination system 10 positioned in the top layer. Forced ventilation is performed in each layer so that the influence of heat between layers is minimized.

I claim:

1. A fluorescence microscope having an illuminating system for irradiating an excitation light onto a sample for observation of a fluorescent image of the sample, comprising:
    (a) a transmissive illumination light source, which is arranged above a stage for placing the sample and said transmissive illumination light source is arranged facing a horizontal direction;
    (b) a tilt mirror, which reflects light from the transmissive illumination source and illuminates the sample on the stage from above;
    (c) a transmissive illumination optical unit including at least the tilt mirror is disposed so as to move in a direction in which said transmissive illumination optical unit is brought away from the stage from a normal position; and
    (d) a sample cover for shielding a light from said stage, wherein said sample cover is displaceable downward so as to expose said stage.

2. The fluorescence microscope according to claim 1, further comprising:
    a main unit case enclosing said fluorescence microscope, wherein said sample cover is displaced, downward along a front face of said main unit case thus exposing said stage.

3. The fluorescence microscope according to claim 2, further comprising:
    an imaging system for picking up the fluorescent image, wherein said fluorescence microscope is an inverted fluorescence microscope with an objective lens arranged below said stage, and wherein said main unit case further includes a lower cover positioned below said sample cover, said lower cover having a cross section of a trapezoid substantially the same as that of the sample cover, and said sample cover is displaced forward and downward in order for said sample cover to be adjacent to the lower cover to cause the sample cover to overlap the lower cover, thus exposing said stage.

4. The fluorescence microscope according to claim 3, wherein said sample cover has a cross section of a shape of "C" in alphabet capable of enclosing a front face and side faces of said stage.

5. The fluorescence microscope according to claim 4, wherein said sample cover can be displaced downward along an outer surface of said lower cover thus exposing said stage.

6. The fluorescence microscope according to claim 3, wherein said sample cover can be displaced downward along an outer surface of said lower cover thus exposing said stage.

7. The fluorescence microscope according to claim 1, further comprising an epi illumination light source which is arranged below the stage and arranged facing the horizontal direction, wherein the light from the epi illumination light source is irradiated on the sample from below the stage via an excitation filter and a dichroic mirror which are arranged below the stage.

8. The fluorescence microscope according to claim 7, further comprising an objective lens between the stage and the dichroic mirror.

9. The fluorescence microscope according to claim 7, wherein the excitation filter and the dichroic mirror are configured as a pair of a filter cassette, and a plurality of the filter cassettes are provided on a rotary base plate so that a desired filter cassette can be positioned.

10. The fluorescence microscope according to claim 1, further comprising an imaging mirror arranged directly below the stage, and an imaging device arranged below the stage and facing horizontally toward the imaging mirror.

11. The fluorescence microscope according to claim 10, further comprising an objective lens between the stage and the imaging mirror.

12. The fluorescence microscope according to claim 1, wherein the transmissive illumination optical unit is retracted by rotating, upward, or widthwise.

* * * * *